United States Patent
Tsubouchi

(10) Patent No.: US 11,790,277 B2
(45) Date of Patent: Oct. 17, 2023

(54) MULTIPLE REGRESSION ANALYSIS APPARATUS AND MULTIPLE REGRESSION ANALYSIS METHOD

(71) Applicant: TOYOTA JIDOSHA KABUSHIKI KAISHA, Toyota (JP)

(72) Inventor: Takahiro Tsubouchi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1037 days.

(21) Appl. No.: 16/536,378

(22) Filed: Aug. 9, 2019

(65) Prior Publication Data
US 2020/0111029 A1    Apr. 9, 2020

(30) Foreign Application Priority Data

Oct. 3, 2018    (JP) .................................. 2018-188305

(51) Int. Cl.
*G06F 17/18* (2006.01)
*G06N 20/20* (2019.01)
*G06N 5/01* (2023.01)

(52) U.S. Cl.
CPC .............. *G06N 20/20* (2019.01); *G06N 5/01* (2023.01)

(58) Field of Classification Search
CPC ................................. G06F 17/18; G06N 20/20
USPC ......................................................... 706/12
See application file for complete search history.

(56) References Cited

U.S. PATENT DOCUMENTS

| 10,741,066 | B2* | 8/2020 | Jeng ...................... G08G 1/052 |
| 2007/0288105 | A1* | 12/2007 | Sekine .................... G05B 17/02 700/52 |
| 2008/0249957 | A1* | 10/2008 | Masuyama ............ G06Q 40/06 705/36 R |
| 2010/0003831 | A1* | 1/2010 | Yasuda .................... C23C 16/52 438/758 |
| 2010/0070441 | A1* | 3/2010 | Yuta ...................... G06K 9/6267 702/179 |
| 2011/0208495 | A1* | 8/2011 | Yuta ........................ G06F 17/18 703/2 |

(Continued)

FOREIGN PATENT DOCUMENTS

| JP | 2014235481 A | 12/2014 |
| JP | 2016031714 A | 3/2016 |

(Continued)

*Primary Examiner* — Nga B Nguyen
(74) *Attorney, Agent, or Firm* — Dickinson Wright, PLLC

(57) ABSTRACT

A multiple regression analysis apparatus capable of accurately performing a multiple regression analysis is provided. A multiple regression analysis apparatus includes a determination unit, a division unit, an analysis unit, and a regression equation acquisition unit. The determination unit determines one of a plurality of explanatory variables that is effective as a parameter when stratification of a plurality of data sets is performed to be a stratification explanatory variable. The division unit divides the plurality of data sets for each layer using the stratification explanatory variable. The analysis unit performs a multiple regression analysis on each of groups of the plurality of data sets that have been divided. The regression equation acquisition unit acquires an integrated multiple regression equation in which results of the multiple regression analysis are integrated.

3 Claims, 18 Drawing Sheets

(56) References Cited

U.S. PATENT DOCUMENTS

2011/0238606 A1* 9/2011 Ide .................... G06F 17/18
                                              706/12
2018/0203439 A1   7/2018 Hattori et al.
2019/0274598 A1* 9/2019 Scott .................. A61B 5/14546

FOREIGN PATENT DOCUMENTS

JP      2017123088 A    7/2017
JP      2018116545 A    7/2018

* cited by examiner

|  | OBJECTIVE VARIABLE | EXPLANATORY VARIABLE | | | | |
|---|---|---|---|---|---|---|
|  | y | X001 | X002 | X003 | ... | X317 | X318 |
| DATA SET#1 | 1 | 14 | 31.73869 | 2.845135 | ... | 18 | 72 |
| DATA SET#2 | 1.2 | 15 | 39.57421 | 2.875779 | ... | 27 | 90 |
| DATA SET#3 | 1.9 | 10 | 26.62501 | 1.929838 | ... | 14 | 54 |
|  | ... | ... | ... | ... |  | ... | ... |
| DATA SET#25 | 10.9 | 63 | 15.74985 | 1.799323 | ... | 6 | 26 |
| DATA SET#26 | 11.6 | 21 | 6.400687 | 1.711125 | ... | 4 | 20 |

| EXPLANATORY VARIABLE | NUMBER OF TIMES EXPLANATORY VARIABLE IS EMPLOYED FOR FIRST BRANCH IN RANDOM FOREST | CONTRIBUTION RATE |
|---|---|---|
| X002 | 3905 | 3.9% |
| X132 | 3261 | 3.3% |
| X133 | 3216 | 3.2% |
| ... | ... | ... |
| X085 | 1474 | 1.5% |
| X237 | 1468 | 1.5% |
| ... | ... | ... |

Fig. 9

|  | OBJECTIVE VARIABLE | EXPLANATORY VARIABLE | | | |
|---|---|---|---|---|---|
|  | y | X002 | X132 | X133 | ... |
| DATA SET#1 | 1 | 31.73869 | -12.40349 | 12.40349 | ... |
| DATA SET#2 | 1.2 | 39.57421 | -12.43817 | 12.43817 | ... |
| DATA SET#3 | 1.9 | 26.62501 | -12.41844 | 12.41844 | ... |
|  | ... | | | | |
| DATA SET#25 | 10.9 | 15.74985 | -12.02397 | 12.02397 | ... |
| DATA SET#26 | 11.6 | 6.400687 | -11.78295 | 11.78295 | ... |
| n=16 | | | | | |
| (1)LOWmax | | 42.483 | -12.189 | 13.076 | ... |
| (2)HIGHmin | | 2.576 | -12.095 | 11.555 | ... |
| (2)-(1) | | -39.9064 | 0.0937 | -1.521 | ... |
| (3)LOWmin | | 15.772 | -13.076 | 12.189 | ... |
| (4)HIGHmax | | 15.750 | -11.555 | 12.095 | ... |
| (3)-(4) | | 0.02215 | -1.521 | 0.0937 | ... |
| DETERMINATION (POSITIVELY-SLOPED) | | NG | OK | NG | ... |
| DETERMINATION (NEGATIVELY-SLOPED) | | OK | NG | OK | ... |
| COEFFICIENTS OF DETERMINATION $R^2$ OF SINGLE REGRESSION | | 0.576 | 0.577 | 0.571 | ... |

Fig. 12

MULTIPLE REGRESSION ANALYSIS APPARATUS AND MULTIPLE REGRESSION ANALYSIS METHOD

CROSS REFERENCE TO RELATED APPLICATIONS

This application is based upon and claims the benefit of priority from Japanese patent application No. 2018-188305, filed on Oct. 3, 2018, the disclosure of which is incorporated herein in its entirety by reference.

BACKGROUND

The present disclosure relates to a multiple regression analysis apparatus and a multiple regression analysis method, and more particularly, to a multiple regression analysis apparatus and a multiple regression analysis method for performing a multiple regression analysis on a plurality of data sets, each of which is composed of a plurality of explanatory variables and an objective variable.

Japanese Unexamined Patent Application Publication No. 2016-031714 discloses a multiple regression analysis apparatus configured to predict an objective variable of time series data from at least two types of explanatory variables. In the multiple regression analysis apparatus disclosed in Japanese Unexamined Patent Application Publication No. 2016-031714, besides these explanatory variables, data that has been subjected to a differential operation, the data being derived from the existing explanatory variables, is further added as a new differential explanatory variable. Accordingly, in the technique disclosed in Japanese Unexamined Patent Application Publication No. 2016-031714, it is possible to improve the accuracy of predicting the objective variable of time series data while directly using the framework of the multiple regression analysis.

SUMMARY

In the technique disclosed in Japanese Unexamined Patent Application Publication No. 2016-031714, since new differential explanatory variables are added, the number of explanatory variables to be used for the multiple regression analysis increases. When the number of explanatory variables increases as described above, regression cannot be efficiently performed since the feature quantity to be handled (dimensions) is too large, which may cause generalization performance to be reduced (which is often referred to as "the curse of dimensionality"). Therefore, it has been required to accurately perform a multiple regression analysis even when the number of explanatory variables is large.

The present disclosure provides a multiple regression analysis apparatus and a multiple regression analysis method capable of accurately performing a multiple regression analysis.

A multiple regression analysis apparatus according to the present disclosure is a multiple regression analysis apparatus configured to perform a multiple regression analysis on a plurality of data sets, each of which is composed of a plurality of explanatory variables and an objective variable, the apparatus including: a determination unit configured to determine one of the plurality of explanatory variables that is effective as a parameter when stratification of the plurality of data sets is performed to be a stratification explanatory variable; a division unit configured to divide the plurality of data sets for each layer using the stratification explanatory variable; an analysis unit configured to perform a multiple regression analysis on each of groups of the plurality of data sets that have been divided; and an acquisition unit configured to acquire an integrated multiple regression equation in which results of the multiple regression analysis are integrated.

Further, a multiple regression analysis method according to the present disclosure is a multiple regression analysis method for performing a multiple regression analysis on a plurality of data sets, each of which is composed of a plurality of explanatory variables and an objective variable, the method including: determining one of the plurality of explanatory variables that is effective as a parameter when stratification of the plurality of data sets is performed to be a stratification explanatory variable; dividing the plurality of data sets for each layer using the stratification explanatory variable; performing a multiple regression analysis on each of groups of the plurality of data sets that have been divided; and acquiring an integrated multiple regression equation in which results of the multiple regression analysis are integrated.

The present disclosure is configured to automatically perform stratification on the plurality of data sets, perform a multiple regression analysis on each of the groups of the data sets that have been stratified, and acquire the integrated multiple regression equation in which these results are integrated. In this way, the multiple regression analysis is performed separately on each of the groups of the data sets that have been stratified, whereby it becomes possible to accurately perform a multiple regression analysis.

Further, preferably, the multiple regression analysis apparatus includes: a calculation unit configured to calculate a contribution rate of each of the plurality of explanatory variables to the objective variable; and an extraction unit configured to extract the explanatory variables, the number of which satisfies a predetermined condition and the calculated contribution rates of which are high, from among the plurality of explanatory variables, in which the determination unit determines the stratification explanatory variable from the extracted explanatory variables.

The present disclosure is configured to determine the stratification explanatory variable after the number of explanatory variables is narrowed down to the explanatory variables whose respective contribution rates are high in advance. Accordingly, the number of explanatory variables regarding which it is determined whether they may serve as the stratification explanatory variable can be reduced, whereby it becomes possible to improve the speed of determining the stratification explanatory variable.

Further, preferably, the calculation unit calculates the contribution rate using a non-linear regression method.

According to the present disclosure, the contribution rate is calculated using the non-linear regression method, whereby it becomes possible to efficiently determine the effective stratification explanatory variable.

Further, preferably, the calculation unit calculates the contribution rate using a random forest.

The above-described configuration of the present disclosure makes it possible to further improve the speed of determining the stratification explanatory variable.

Further, preferably, the determination unit determines, when there are a plurality of candidates for the stratification explanatory variable, the candidate whose coefficient of determination when a single regression analysis is performed is the lowest to be the stratification explanatory variable.

The above-described configuration of the present disclosure makes it possible to determine an explanatory variable that is advantageous for the non-linear regression to be the stratification explanatory variable. Accordingly, it becomes possible to further improve the accuracy of determining the stratification explanatory variable, that is, the accuracy of the multiple regression analysis.

According to the present disclosure, it is possible to provide a multiple regression analysis apparatus and a multiple regression analysis method capable of accurately performing a multiple regression analysis.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 6 is a diagram for illustrating data sets acquired by a data acquisition unit according to the first embodiment;

FIG. 9 is a diagram for illustrating a state in which explanatory variables are aligned in a descending order of contribution rates;

FIG. 12 is a diagram for explaining a specific example of determination of the stratification explanatory variable;

DESCRIPTION OF EMBODIMENTS

First Embodiment

Hereinafter, with reference to the drawings, embodiments of the present disclosure will be explained. Throughout the drawings, the same elements are denoted by the same reference symbols, and overlapping descriptions are omitted as necessary.

Figure 1:
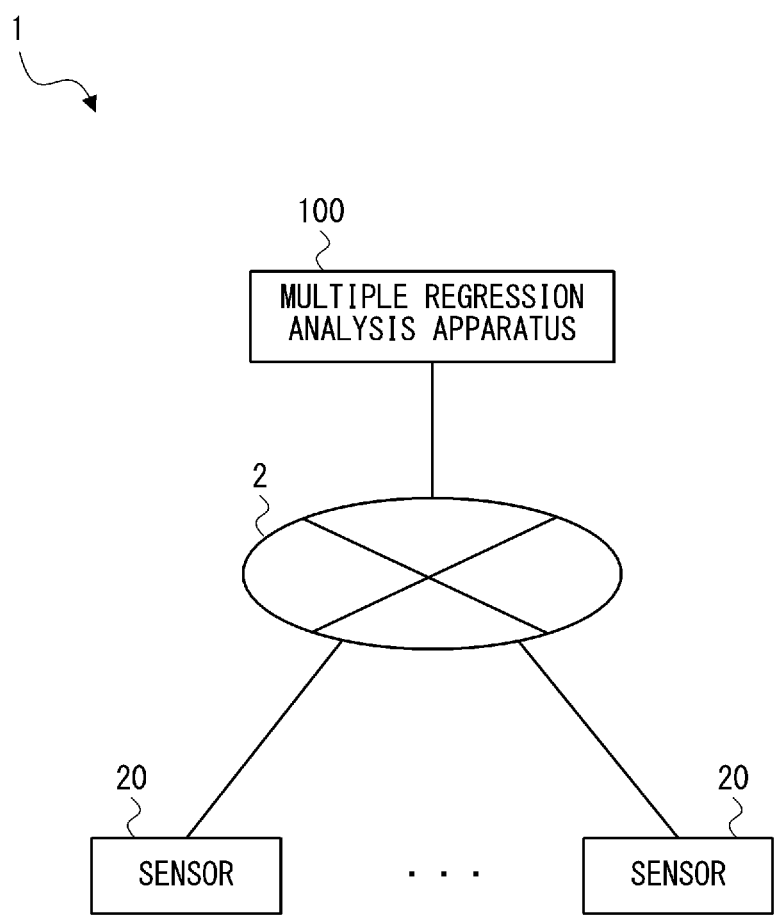
FIG. 1 is a diagram showing an analysis system according to a first embodiment.

FIG. 1 is a diagram showing an analysis system 1 according to a first embodiment. The analysis system 1 includes a plurality of sensors 20 and a multiple regression analysis apparatus 100. The sensors 20 and the multiple regression analysis apparatus 100 may be connected to each other so that they can communicate with each other via a wired or a wireless network 2. The analysis system 1 may be, for example, mounted on a vehicle, but the configuration of the analysis system 1 is not limited thereto.

Each of the plurality of sensors 20 detects various states regarding an evaluation target of the analysis system 1. When the analysis system 1 is mounted on a vehicle, the sensors 20 detect various states (physical quantity) in the vehicle. When, for example, the analysis system 1 performs an analysis on a catalyst of an exhaust system at a time of bench evaluation of an engine, the sensors 20 detect the exhaust gas NOx concentration of the catalyst, an accelerator opening degree, a gasoline supply amount, inlet-gas temperature of the catalyst, inlet-gas concentration of the catalyst, catalyst temperature and the like in various material conditions of the catalyst. Further, when, for example, the analysis system 1 performs an analysis regarding bench evaluation of a lithium ion battery, the sensors 20 detect a battery output, a current, a current change amount, a continuous charge (discharge) amount within a past fixed period of time, the temperature of the battery, a charge amount and the like in various material conditions of the lithium ion battery.

The multiple regression analysis apparatus 100 performs a multiple regression analysis on a plurality of data sets, each of which is composed of a plurality of explanatory variables and an objective variable. The data sets will be explained later with reference to FIG. 6. The multiple regression analysis apparatus 100 performs the multiple regression analysis using one of the states detected by the sensors 20 as the objective variable and the other states as the explanatory variables. In the above example, when the analysis system 1 performs an analysis on a catalyst of an exhaust system at a time of bench evaluation of an engine, the exhaust gas NOx concentration of the catalyst may be used as the objective variable and the accelerator opening degree, the gasoline supply amount, the inlet-gas temperature of the catalyst, the inlet-gas concentration of the catalyst, the catalyst temperature and the like may be used as the explanatory variables. Further, when the analysis system 1 performs an analysis regarding bench evaluation of a lithium battery, the battery output may be used as the objective variable, and the current, the current change amount, the continuous charge (discharge) amount within a past fixed period of time, the temperature of the battery, the charge amount and the like may be used as the explanatory variables.

The multiple regression analysis apparatus 100 according to the first embodiment determines an explanatory variable, from among the plurality of explanatory variables, that is effective as a parameter when stratification (division of regions) of a plurality of data sets is performed to be a stratification explanatory variable. The stratification explanatory variable will be explained later. The multiple regression analysis apparatus 100 divides the plurality of data sets for each layer using the stratification explanatory variable.

Further, the multiple regression analysis apparatus 100 performs the multiple regression analysis on each of groups of the plurality of data sets that have been divided. Further, the multiple regression analysis apparatus 100 acquires an integrated multiple regression equation in which results of the multiple regression analysis are integrated. Accordingly, the multiple regression analysis apparatus 100 according to the first embodiment automatically performs stratification and performs the multiple regression analysis on each of the groups of the plurality of data sets that have been stratified, whereby it becomes possible to accurately perform the multiple regression analysis even when there are a number of explanatory variables. The details thereof will be explained later.

Figure 2:
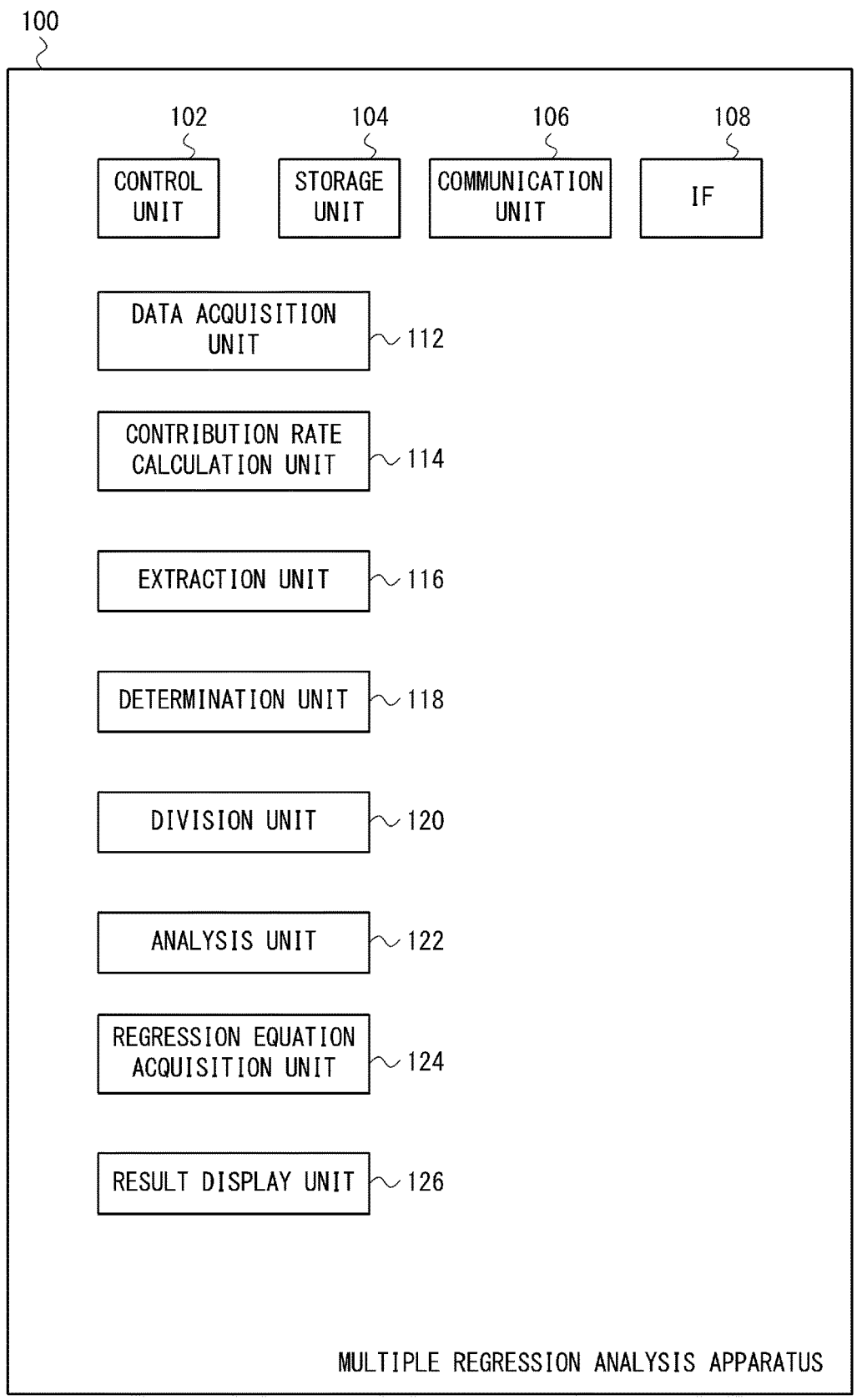
FIG. 2 is a diagram showing a configuration of a multiple regression analysis apparatus according to the first embodiment.

FIG. 2 is a diagram showing a configuration of the multiple regression analysis apparatus 100 according to the first embodiment. The multiple regression analysis apparatus 100 includes a control unit 102, a storage unit 104, a communication unit 106, and an interface unit 108 (IF) as main hardware configurations. The control unit 102, the storage unit 104, the communication unit 106, and the interface unit 108 are connected to one another via a data bus or the like.

The control unit 102 is, for example, a processor such as a Central Processing Unit (CPU). The control unit 102 includes a function as an operation apparatus that performs control processing, operation processing and the like. The storage unit 104 is, for example, a storage device such as a memory or a hard disc. The storage unit 104 is, for example, a Read Only Memory (ROM) or a Random Access Memory (RAM). The storage unit 104 includes a function of storing a control program, an operation program and the like executed by the control unit 102. Further, the storage unit 104 includes a function of temporarily storing processing data and the like. The storage unit 104 may include a database.

The communication unit 106 performs processing necessary for performing communication with another apparatus such as the sensors 20 via the network 2. The communication unit 106 may include a communication port, a router, a firewall and the like. The interface unit 108 includes, for example, a user interface (UI). The interface unit 108 includes an input device such as a keyboard, a touch panel, or a mouse, and an output device such as a display or a speaker. The interface unit 108 accepts operation of input of data by a user (operator) and outputs information to the user.

Further, the multiple regression analysis apparatus 100 includes a data acquisition unit 112, a contribution rate calculation unit 114, an extraction unit 116, a determination unit 118, a division unit 120, an analysis unit 122, a regression equation acquisition unit 124, and a result display unit 126 (hereinafter they are referred to as "each of the components"). The data acquisition unit 112, the contribution rate calculation unit 114, the extraction unit 116, and the determination unit 118 respectively function as data acquisition means, contribution rate calculation means, extraction means, and determination means. Further, the division unit 120, the analysis unit 122, the regression equation acquisition unit 124, and the result display unit 126 respectively function as division means, analysis means, regression equation acquisition means, and result display means.

Each of the components may be obtained by, for example, causing a program to be executed by control by the control unit 102. More specifically, each of the components may be obtained by the control unit 102 executing a program stored in the storage unit 104. Alternatively, each of the components may be obtained by storing a necessary program in a desired non-volatile storage medium and installing it as necessary. Further, each of the components is not limited to being obtained by software by a program, and may be obtained by, for example, any combination of hardware, firmware, and software. Further, each of the components may be obtained by using, for example, user programmable integrated circuit such as a field-programmable gate array (FPGA) or a microcomputer. In this case, a program composed of each of the components described above may be obtained by using this integrated circuit. The same holds true for the other embodiments that will be described later. While specific functions of the respective components will be explained later, an outline of a function of each of the components will be explained below.

The data acquisition unit 112 acquires a plurality of data sets. The contribution rate calculation unit 114 calculates the contribution rate of each of the plurality of explanatory variables that composes a data set to the objective variable. The extraction unit 116 extracts the explanatory variables, the number of which satisfies a predetermined condition, whose respective contribution rates calculated by the contribution rate calculation unit 114 are high, from among the plurality of explanatory variables.

The determination unit 118 determines an explanatory variable that is effective as a parameter when stratification of the plurality of data sets is performed from the explanatory variables whose respective contribution rates are high, the explanatory variables being extracted by the extraction unit 116, as the stratification explanatory variable. The division unit 120 divides the plurality of data sets for each layer using the stratification explanatory variable. The "stratification explanatory variable" means an explanatory variable such that a plurality of data sets are divided for each layer when the plurality of data sets are divided (allocated) with a certain threshold of the stratification explanatory variable as a boundary.

Figure 3:
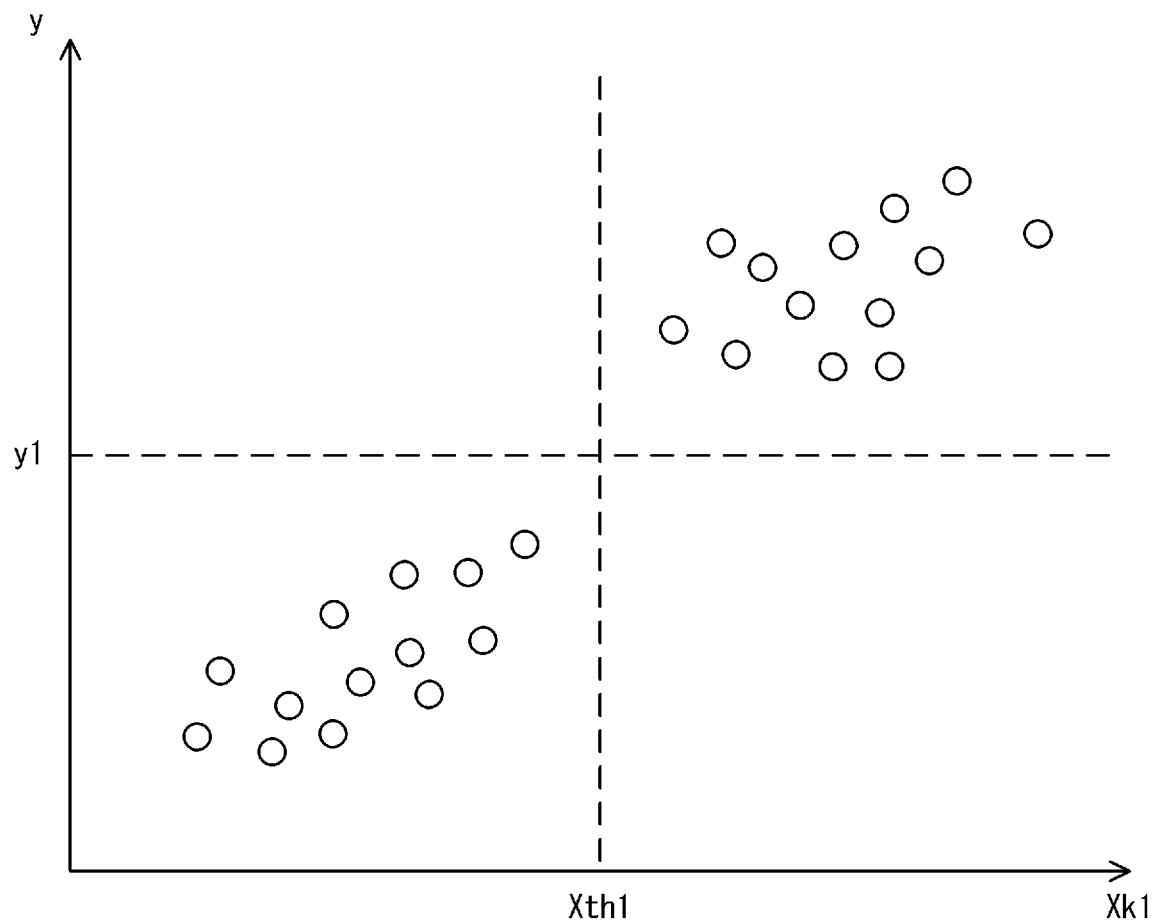
FIG. 3 is a diagram for explaining a stratification explanatory variable.
Figure 4:
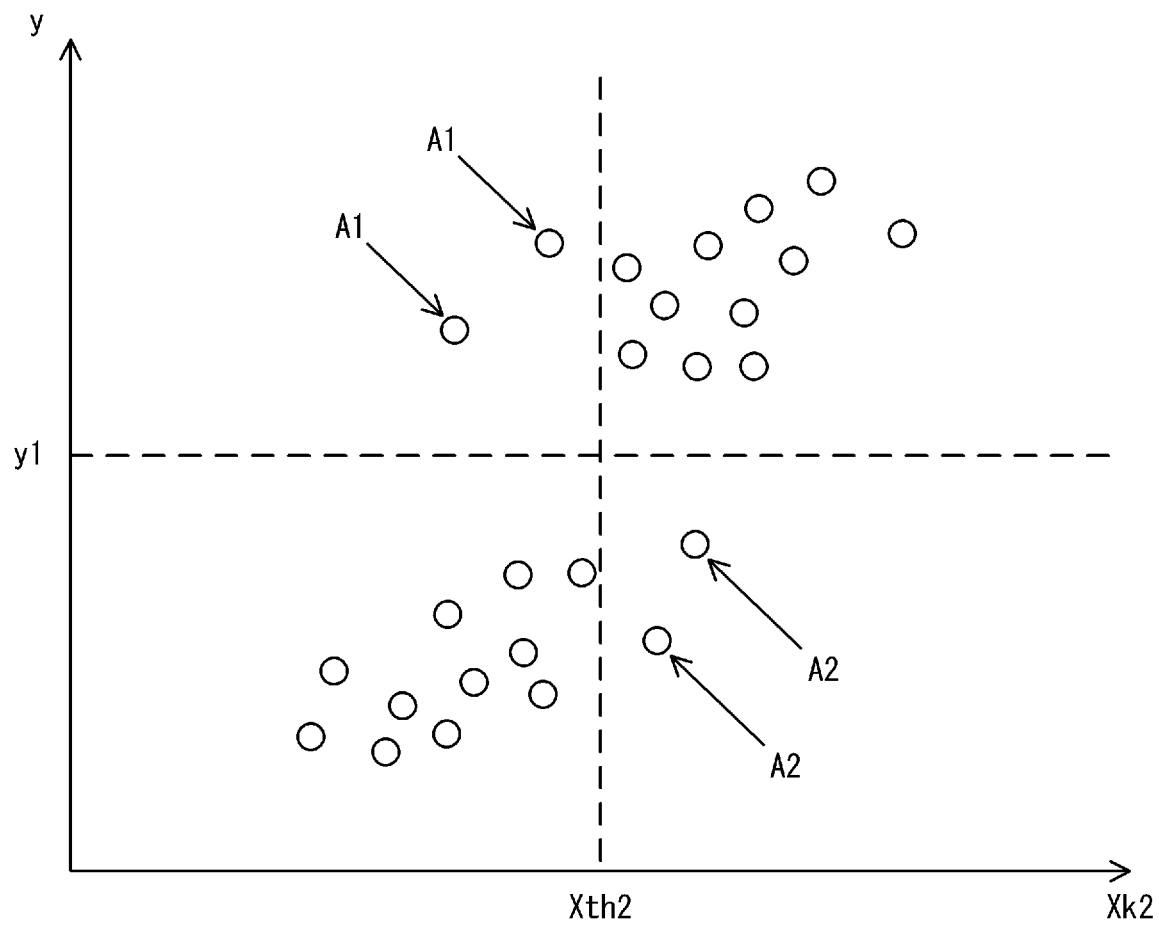
FIG. 4 is a diagram for explaining the stratification explanatory variable.

FIGS. 3 and 4 are diagrams each explaining the stratification explanatory variable. In the examples shown in FIGS. 3 and 4, each of the data sets is composed of the objective variable, which is denoted by y, and the explanatory variables, which are denoted by X1-XM. The "M", which is an integer equal to or larger than two, indicates the number of explanatory variables. In the examples shown in FIGS. 3 and 4, each of the hollow circles (white circles) indicates the data set.

FIG. 3 is a distribution diagram of data sets in a case in which the vertical axis indicates the objective variable y and the horizontal axis indicates the explanatory variable Xk1. In this case, all the values of the objective variables y of the data sets in which the explanatory variable Xk1 is larger than a threshold Xth1 are smaller than y1. Further, all the values of the objective variables y of the data sets in which the explanatory variable Xk1 is larger than the threshold Xth1 are larger than y1. In other words, all the values of the explanatory variables Xk1 of the data sets in which the objective variable y is smaller than y1 are smaller than Xth1 and all the values of the explanatory variables Xk1 of the data sets in which the objective variable y is larger than y1 are larger than Xth1. In this way, the data sets are classified for each layer by the threshold Xth1 in the explanatory variable Xk1. Accordingly, the explanatory variable Xk1 may become the stratification explanatory variable as it is effective as a parameter when stratification of the plurality of data sets is performed.

FIG. 4 is a distribution diagram of data sets in a case in which the vertical axis indicates the objective variable y and the horizontal axis indicates the explanatory variable Xk2. In this case, not all the values of the objective variables y of the data sets in which the explanatory variable Xk2 is smaller than a threshold Xth2 are smaller than y1, and some of the values of the objective variables y are larger than y1, like the data sets indicated by arrows A1. Further, not all the values of the objective variables y of the data sets in which the explanatory variable Xk2 is larger than the threshold Xth2 are larger than y1. Some of the values of the objective variables y are smaller than y1, like the data sets indicated by arrows A2. In other words, not all the values of the explanatory variables Xk2 of the data sets in which the objective variable y is smaller than y1 are smaller than Xth2. Further, not all the values of the explanatory variables Xk2 of the data sets in which the objective variable y is larger than y1 are larger than Xth2. That is, the objective variables (and the explanatory variables) in some data sets fall within another hierarchy (section) (i.e., cross the threshold). In this way, in the threshold Xth2 in the explanatory variable Xk2, the data sets are not classified for each layer. Accordingly, the explanatory variable Xk2 is not effective as the stratification explanatory variable.

The analysis unit 122 (FIG. 2) independently performs the multiple regression analysis on each of groups of the plurality of data sets that have been divided by the division unit 120. The regression equation acquisition unit 124 acquires the integrated multiple regression equation in which results of the multiple regression analysis are integrated. The integrated multiple regression equation will be explained later. The result display unit 126 displays results of performing the multiple regression analysis using the integrated multiple regression equation.

Figure 5:
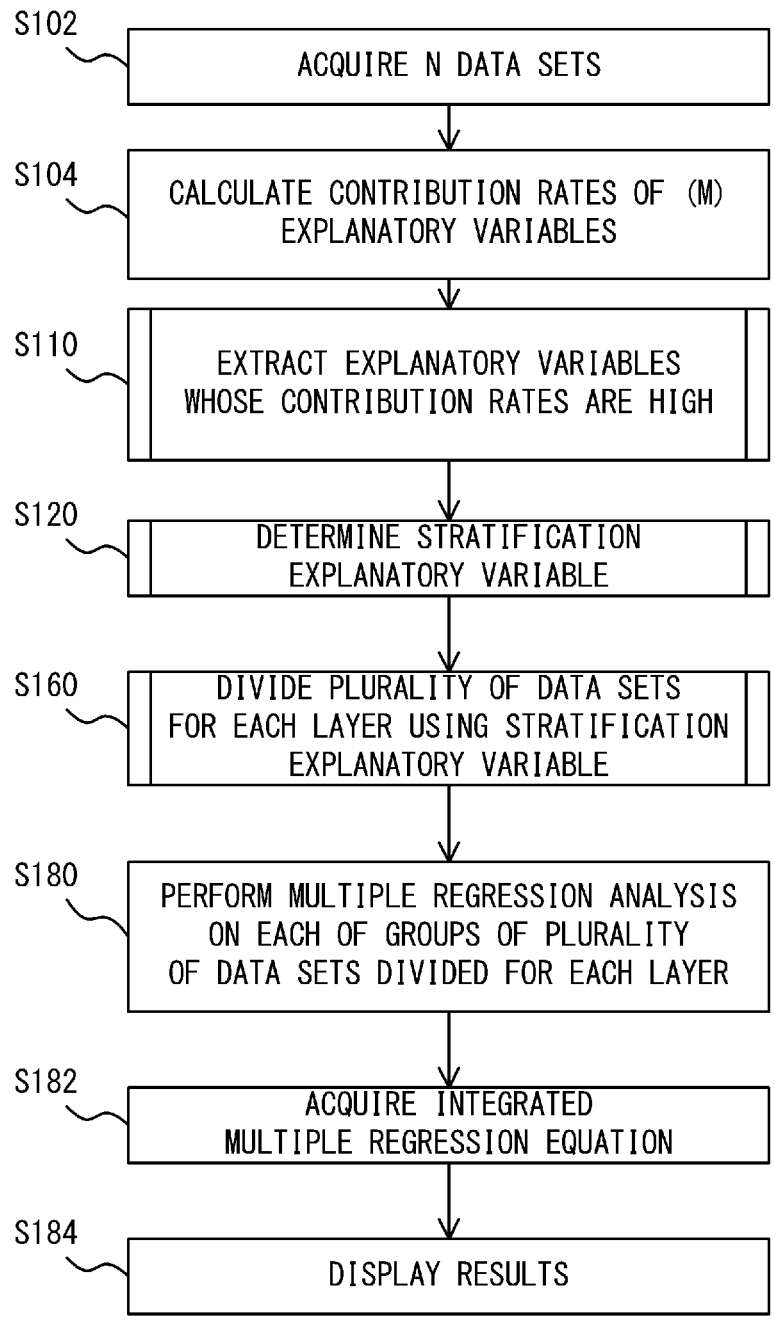
FIG. 5 is a flowchart showing a multiple regression analysis method executed by the multiple regression analysis apparatus according to the first embodiment.

FIG. 5 is a flowchart showing a multiple regression analysis method executed by the multiple regression analysis apparatus 100 according to the first embodiment. First, the data acquisition unit 112 acquires N data sets (Step S102). Specifically, the data acquisition unit 112 acquires values indicating the states detected by the plurality of sensors 20. The data acquisition unit 112 acquires one data set using one of states detected by the plurality of sensors 20 as the objective variable and using the other states as the explanatory variables in a certain material condition or the like of an evaluation target. Then the data acquisition unit 112 acquires one data set in a way similar to that in another material condition. In this way, the data acquisition unit 112 acquires N data sets. The objective variable and the explanatory variables that compose a data set are not limited to being detected by the sensor 20.

FIG. 6 is a diagram for illustrating a data set acquired by the data acquisition unit 112 according to the first embodiment. The number of data sets N illustrated in FIG. 6 is 26 (N=26). Further, each of the data sets is composed of the objective variable y and 318 (M=318) explanatory variables X001-X318. In the example shown in FIG. 6, the data sets #1-#26 are arranged from the one whose objective variable y is the smallest (in an ascending order of the objective variables y).

Next, the contribution rate calculation unit 114 calculates the contribution rates (degree of importance) of all the M explanatory variables to the objective variable y (Step S104). Specifically, the contribution rate calculation unit 114 calculates the contribution rates using an algorithm of machine learning. More specifically, the contribution rate calculation unit 114 calculates the contribution rates using a non-linear regression method of machine learning. The non-linear regression method includes, for example, a random forest, support vector regression, multinomial logistic regression or the like. When the random forest of the non-linear regression method is used, the speed of calculating the contribution rates is faster than that when the other methods are used. Accordingly, an example in which the random forest is used will be explained below.

The contribution rate calculation unit 114 performs the regression analysis of the objective variable y on the plurality of data sets using the random forest that uses each explanatory variable for condition branch. In this embodiment, the results of the regression analysis using the random forest are not used for the regression of the objective variable y and are used only for the calculation of the contribution rates (the degree of importance) of the explanatory variables, as will be explained later. The contribution rate calculation unit 114 counts each of the number of explanatory variables employed for the first branch of the decision tree generated at the time of regression analysis using this random forest.

Figure 7:
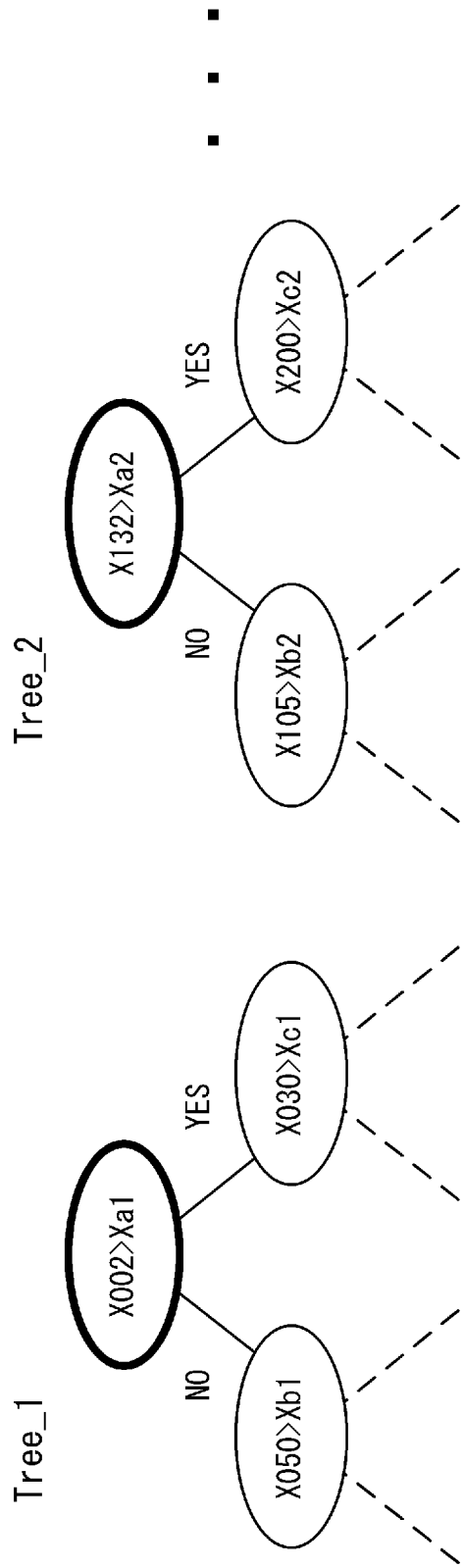
FIG. 7 is a diagram for illustrating decision trees used in a regression analysis by a random forest.

FIG. 7 is a diagram for illustrating decision trees used in the regression analysis by the random forest. In a decision tree Tree_1, an explanatory variable X002 is employed for a first branch. In this case, the contribution rate calculation unit 114 increments the number of times the explanatory variable X002 is employed for the first branch. Further, in a decision tree Tree_2, an explanatory variable X132 is employed for the first branch. In this case, the contribution rate calculation unit 114 increments the number of times the explanatory variable X132 is employed for the first branch.

As described above, the number of times each of the explanatory variables is employed for the first branch is counted for all the decision trees Tree_1-Tree_T. Accordingly, the contribution rate calculation unit 114 calculates the number of times Nk each of the explanatory variables Xk is employed for the first branch. The symbol T is the number of decision trees. Then the contribution rate calculation unit 114 calculates the contribution rate εk of each of the explanatory variables Xk by εk=Nk/T*100[%]. The contribution rate calculation unit 114 calculates the contribution rate for each of the M explanatory variables. The contribution rate calculation unit 114 may calculate the contribution rate using another method.

Next, the extraction unit 116 extracts the explanatory variables whose respective contribution rates calculated by the process of S104 are high (Step S110). Specifically, the extraction unit 116 extracts the explanatory variables, the number of which satisfies a predetermined condition, by a method shown in FIG. 8.

Figure 8:
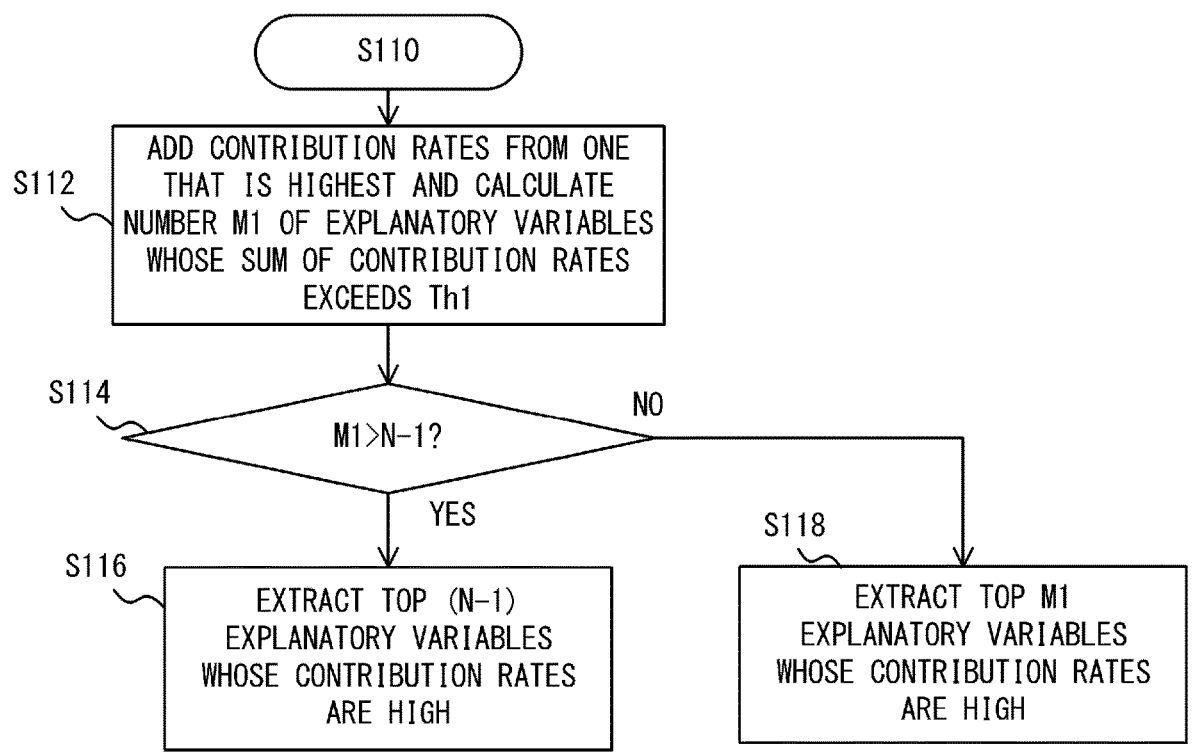
FIG. 8 is a flowchart showing details of processing of extracting explanatory variables according to the first embodiment.

FIG. 8 is a flowchart showing details of processing of extracting the explanatory variables according to the first embodiment. First, the extraction unit 116 adds the contribution rates from the one that is the highest, and calculates the number M1 of explanatory variables whose sum of the contribution rates exceeds the predetermined threshold Th1 (Step S112). While Th1 is, for example, 80[%], Th1 is not limited thereto. Next, the extraction unit 116 determines whether M1 is larger than N−1 (that is, "the number of data sets"−1) (Step S114). When M1 is larger than N−1 (YES in S114), the extraction unit 116 extracts (N−1) explanatory variables from the one whose contribution rate is the highest (Step S116). On the other hand, when M1 is not larger than N−1 (NO in S114), the extraction unit 116 extracts M1 explanatory variables from the one whose contribution rate is the highest (Step S118). While the upper limit of the number of explanatory variables to be extracted is set to (N−1) in this embodiment, this upper limit may not be set.

FIG. 9 is a diagram illustrating a state in which the explanatory variables are arranged in a descending order of the contribution rates. In the example shown in FIG. 9, in the process of S104, the number of decision trees of the random forest is set to 100000 (T=100000). For example, the number of times the explanatory variable X002 is employed for the first branch is 3905, and therefore the contribution rate is 3.9%. In the example shown in FIG. 9, explanatory variables whose respective contribution rates are high are X002, X132, X133, from the one whose contribution rate is high to low. Since M1>N−1 in the example shown in FIG. 9, the extraction unit 116 extracts N−1 (that is, 25) explanatory variables whose respective contribution rates are high.

Next, the determination unit 118 determines the stratification explanatory variable from the explanatory variables whose respective contribution rates are high, the explanatory variables being extracted in S110 (Step S120 in FIG. 5). Specifically, the determination unit 118 determines the stratification explanatory variable by methods shown by flowcharts in FIGS. 10 and 11.

Figure 10:
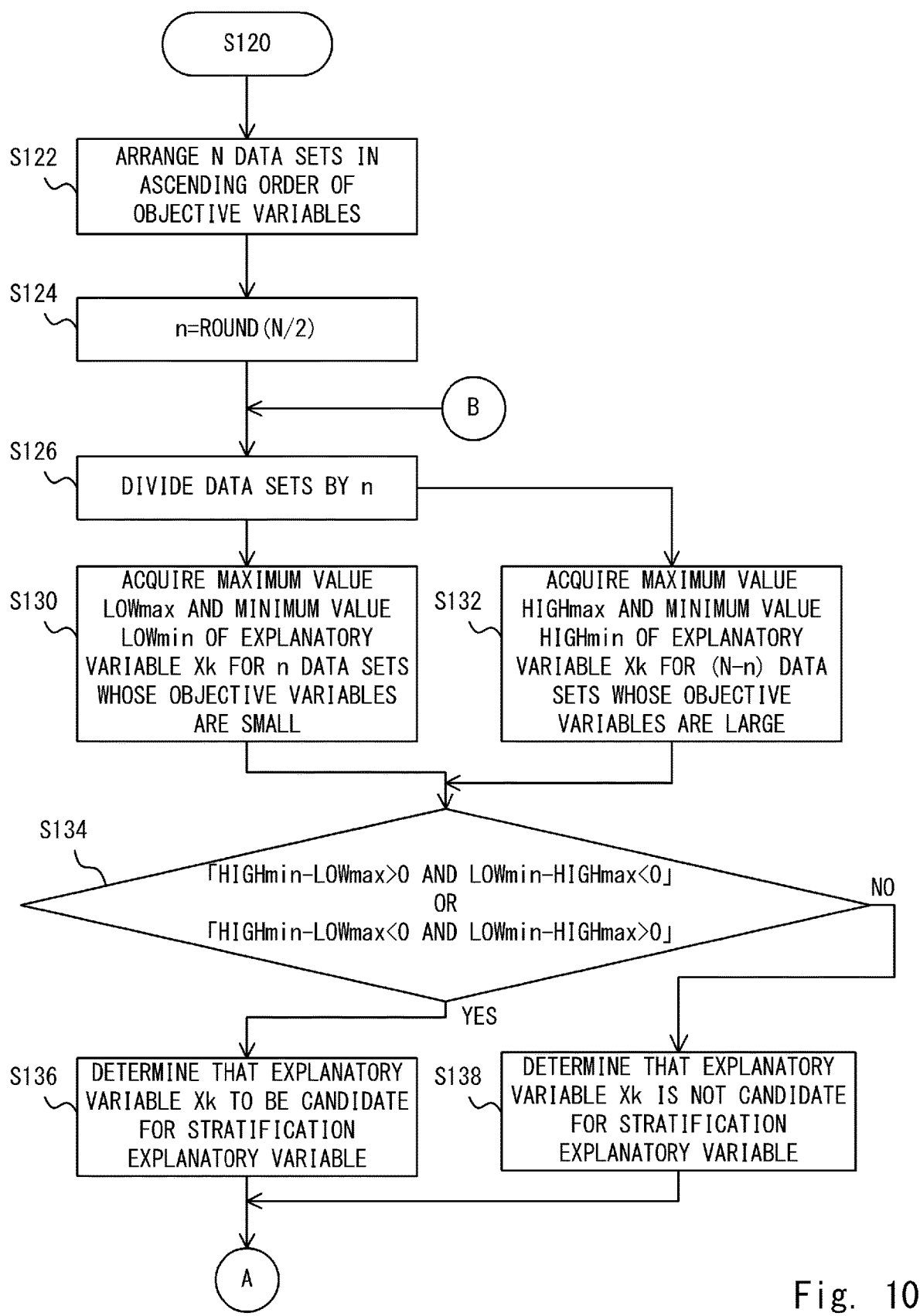
FIG. 10 is a flowchart indicating a method of determining the stratification explanatory variable performed by a determination unit according to the first embodiment.
Figure 11:
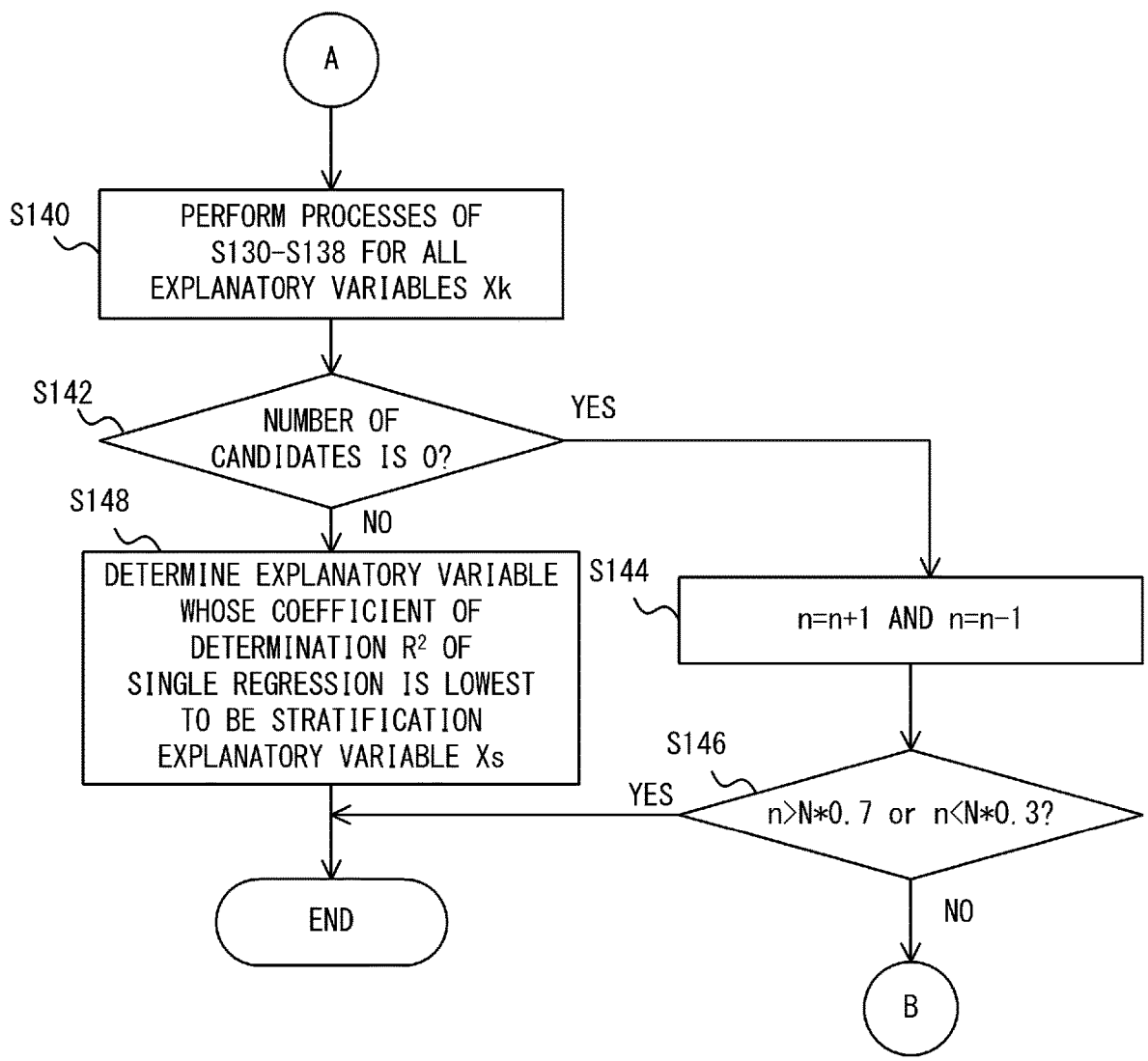
FIG. 11 is a flowchart indicating a method of determining the stratification explanatory variable performed by the determination unit according to the first embodiment.

FIGS. 10 and 11 are flowcharts indicating a method of determining the stratification explanatory variable performed by the determination unit 118 according to the first embodiment. First, the determination unit 118 arranges N data sets in an ascending order of the objective variables y (Step S122). Specifically, while the determination unit 118 arranges the N data sets in an ascending order of the objective variables y as shown in FIG. 6, unlike the example shown in FIG. 6, these data sets are formed of the explanatory variables extracted in the process of S110.

The determination unit 118 sets the initial value of the division number n that is used to divide N data sets in the process of S126 that will be explained later to n=N/2 (this value is brought forward when N is an odd number) (Step S124). That is, the initial value of the division number n is the intermediate value of the number of data sets N. Since N=26 in the example shown in FIG. 6, the initial value of the division number n is 13. The reason why the initial value of the division number n is set to the intermediate value of the number of data sets N is to avoid a situation in which the number of data sets that have been classified into one layer is greatly different from the number of data sets that have been classified into another layer. If the number of data sets that have been classified into one layer is greatly different from the number of data sets that have been classified into another layer, it is possible that the multiple regression analysis may not be performed appropriately using the data sets whose number is smaller than the other one.

Next, the determination unit 118 divides the data set by the division number n (Step S126). Specifically, the determination unit 118 divides the N data sets into n data sets whose objective variables y are small and (N−n) data sets whose objective variables y are large. An arbitrary explanatory variable extracted in the process of S110 is denoted by Xk.

Next, the determination unit 118 acquires the maximum value LOWmax and the minimum value LOWmin of a certain explanatory variable Xk for n data sets (LOW data set) whose objective variables y are small (Step S130). In a similar way, the determination unit 118 acquires the maximum value HIGHmax and the minimum value HIGHmin of the explanatory variable Xk for (N−n) data sets (HIGH data set) whose objective variables are large (Step S132). Each of LOWmax and LOWmin is a value of the explanatory variable Xk of any one of the data sets that compose the LOW data set. In a similar way, each of HIGHmax and HIGHmin is a value of the explanatory variable Xk of any one of the data sets that compose the HIGH data set.

Figure 14:
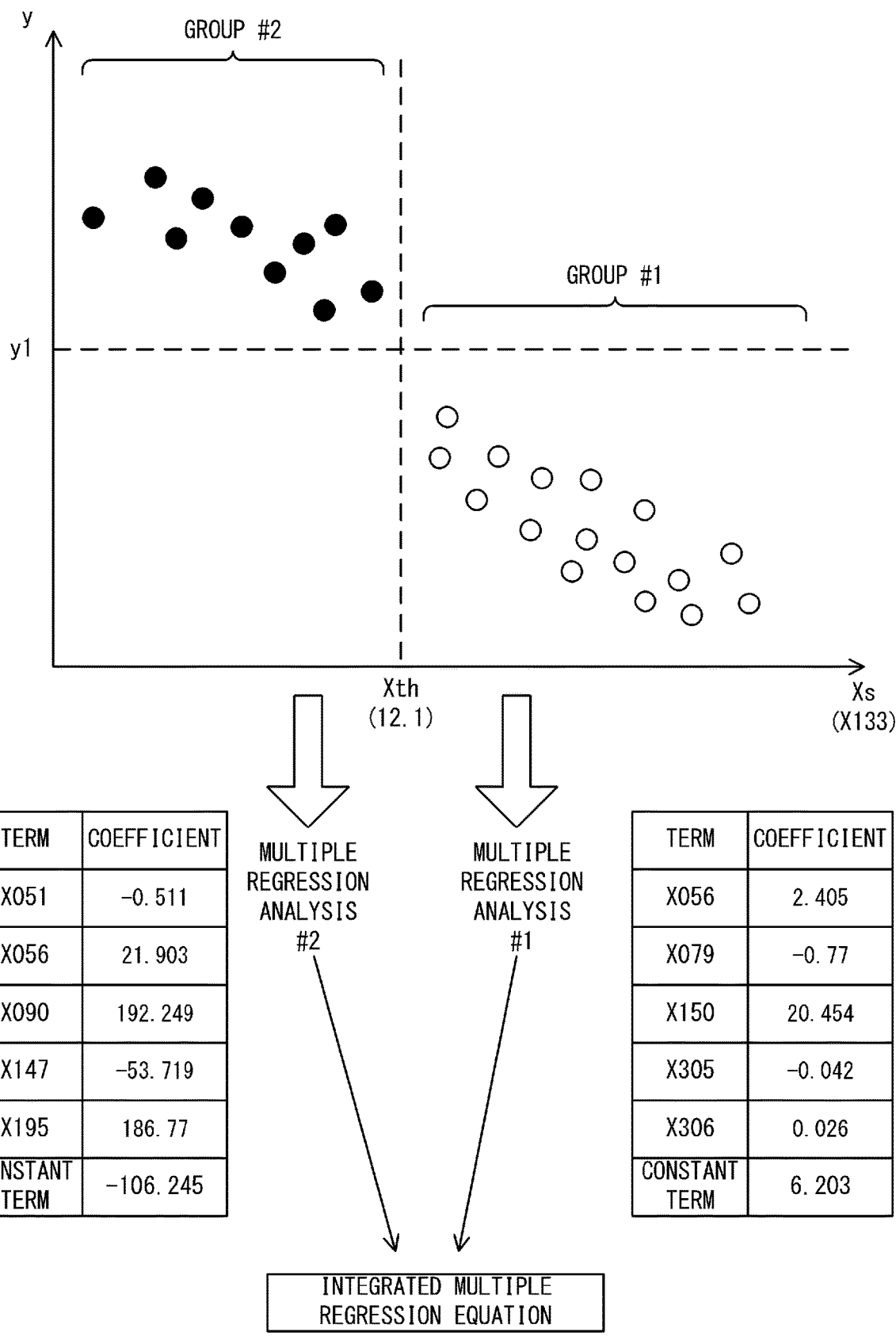
FIG. 14 is a diagram for explaining a specific example of processes of S160-S182 shown in FIG. 5.

Next, the determination unit 118 determines whether explanatory variables satisfy a positively-sloped stratification condition "HIGHmin−LOWmax>0 and LOWmin−HIGHmax<0" or a negatively-sloped stratification condition "HIGHmin−LOWmax<0 and LOWmin−HIGHmax>0" (Step S134). The positively-sloped stratification condition means, as illustrated in FIG. 3, that the explanatory variables Xk of all the data sets are equal to or smaller than a threshold Xth in a hierarchy (section) in which the objective variables y are small and the explanatory variables Xk of all the data sets are larger than the threshold Xth in a hierarchy (section) in which the objective variables y are large. Accordingly, as illustrated in FIG. 3, the data sets are divided (stratified) into an upper right region and a lower left region. On the other hand, when an explanatory variable does not satisfy the positively-sloped stratification condition, the data set is not classify (stratified) into an upper right region and a lower left region, as illustrated in FIG. 4, for example. Further, the negatively-sloped stratification condition means, as illustrated in FIG. 14 described later, that the explanatory variables Xk of all the data sets are larger than a threshold Xth in a hierarchy (section) in which the objective variables y are small and the explanatory variables Xk of all the data sets are equal to or smaller than the threshold Xth in a hierarchy (section) in which the objective variables y are large.

When an explanatory variable satisfies the positively-sloped stratification condition or the negatively-sloped stratification condition (YES in S134), the determination unit 118 determines the explanatory variable Xk to be a candidate for the stratification explanatory variable (Step S136). On the other hand, when the explanatory variable does not satisfy the positively-sloped stratification condition or the negatively-sloped stratification condition (NO in S134), the determination unit 118 determines that the explanatory variable Xk is not a candidate for the stratification explanatory variable (Step S138). Then the determination unit 118 performs processes of S130-S138 for all the explanatory variables Xk extracted in the process of S110 (Step S140).

Next, the determination unit 118 determines whether the number of candidates for the stratification explanatory variable is 0 (Step S142). When the number of candidates for the stratification explanatory variable is 0 (YES in S142), the number of the division number n is incremented and decremented by one (Step S144). Accordingly, two division numbers n are generated before and after the intermediate value (initial value) (that is, a value larger than the intermediate value by one and a value smaller than the intermediate value by one are generated). When, for example, the division number n is 13, n=14 and n=12 are generated. In the second and subsequent process of S144, the division number (e.g., n=14) incremented in the previous processing is further incremented, and the division number (e.g., n=12) decremented in the previous processing is further decremented. That is, as S144 is repeated, two division numbers n go away from the intermediate value (initial value) of the number of data sets N.

Then the determination unit 118 determines whether the larger (incremented) division number n has become larger than N*0.7 or whether the smaller (decremented) division number n has become smaller than N*0.3 (Step S146). When the larger division number n has become larger than N*0.7 or the smaller division number n has become smaller than N*0.3 (YES in S146), the determination unit 118 ends the processing of determining the stratification explanatory variable. Then the process of S160 and the following processes in FIG. 5 are not performed. In this way, the upper limit of the number of times of processing of determining the stratification explanatory variable (increment and decrement of the division number) is set for the following reason. That is, if the division number n is excessively apart from the intermediate value of the number of data sets N, the number of data sets that fall into one group becomes large and the number of data sets that fall into another group becomes small when the data sets are divided by the process of S160, which makes it difficult to appropriately perform the multiple regression analysis for the another group (i.e., the group whose number of data sets becomes small) by the process of S180.

On the other hand, when the larger division number n is not larger than N*0.7 and the smaller division number n is not smaller than N*0.3 (NO in S146), the process goes back to S126. Then the determination unit 118 performs processes of S126-S142 for each of the larger division number n (e.g., n=14) and the smaller division number n (e.g., n=12).

On the other hand, when the number of candidates is not 0 (NO in S142), the determination unit 118 determines the explanatory variable whose coefficient of determination $R^2$ of a single regression analysis is the lowest to be a stratification explanatory variable Xs (Step S148). When the number of candidates is one, the determination unit 118 determines the explanatory variable of one candidate to be the stratification explanatory variable Xs. The single regression analysis for the explanatory variable Xk is a regression analysis in which one explanatory variable Xk is used as the explanatory variable and the objective variable y is used as the objective variable. The "explanatory variable whose coefficient of determination $R^2$ of the single regression analysis is low" means that it is unfavorable for linear regression. In this way, that this explanatory variable Xk has been determined in the process of S110 that the contribution rate thereof is high regardless of the fact that this explanatory variable Xk is unfavorable for the linear regression means that it is highly likely that it is effective for non-linear regression, that is, stratification. Accordingly, this explanatory variable Xk is determined to be the stratification explanatory variable Xs. Note that, however, it does not mean that the stratification explanatory variable cannot be used for linear regression that will explained later. The relation between the non-linear regression and the stratification will be explained later.

FIG. 12 is a diagram for explaining a specific example of determination of the stratification explanatory variable. In the example shown in FIG. 12, the results of determining the explanatory variables X002, X132, and X133 when the division number n=16 are illustrated.

Regarding the explanatory variable X002, the difference between the minimum value HIGHmin (2.576) of the explanatory variable Xk of the HIGH data set and the maximum value LOWmax (42.438) of the explanatory variable Xk of the LOW data set is −39.9064 (<0). Further, the difference between the minimum value LOWmin (15.772) of the explanatory variable Xk of the LOW data set and the maximum value HIGHmax (15.750) of the explanatory variable Xk of the HIGH data set is 0.02215 (>0). Accordingly, the determination unit 118 determines that the explanatory variable X002 satisfies the negatively-sloped stratification condition.

Regarding the explanatory variable X132, the difference between the minimum value HIGHmin (−12.095) of the explanatory variable Xk of the HIGH data set and the maximum value LOWmax (−12.189) of the explanatory variable Xk of the LOW data set is 0.0937 (>0). Further, the difference between the minimum value LOWmin (−13.076) of the explanatory variable Xk of the LOW data set and the maximum value HIGHmax (−11.555) of the explanatory variable Xk of the HIGH data set is −1.521 (<0). Accordingly, the determination unit 118 determines that the explanatory variable X132 satisfies the positively-sloped stratification condition.

Regarding the explanatory variable X133, the difference between the minimum value HIGHmin (11.555) of the explanatory variable Xk of the HIGH data set and the maximum value LOWmax (13.076) of the explanatory variable Xk of the LOW data set is −1.521(<0). Further, the difference between the minimum value LOWmin (12.189) of the explanatory variable Xk of the LOW data set and the maximum value HIGHmax (12.095) of the explanatory variable Xk of the HIGH data set is 0.0937(>0). Accordingly, the determination unit 118 determines that the explanatory variable X133 satisfies the negatively-sloped stratification condition.

The coefficients of determination $R^2$ of the single regression analysis of the explanatory variables X022, X132, and X133 are 0.576, 0.577, and 0.571, respectively. Accordingly, since the explanatory variable whose coefficient of determination $R^2$ is the lowest is X133, the explanatory variable X133 is determined to be a stratification explanatory variable.

Next, the division unit 120 divides the plurality of data sets for each layer using the stratification explanatory variable Xs determined in the process of S120 (Step S160 in FIG. 5). Specifically, as will be described later, the division unit 120 divides the N data sets into two groups depending on whether the explanatory variables are larger than a certain threshold of the stratification explanatory variable Xs or not.

Figure 13:
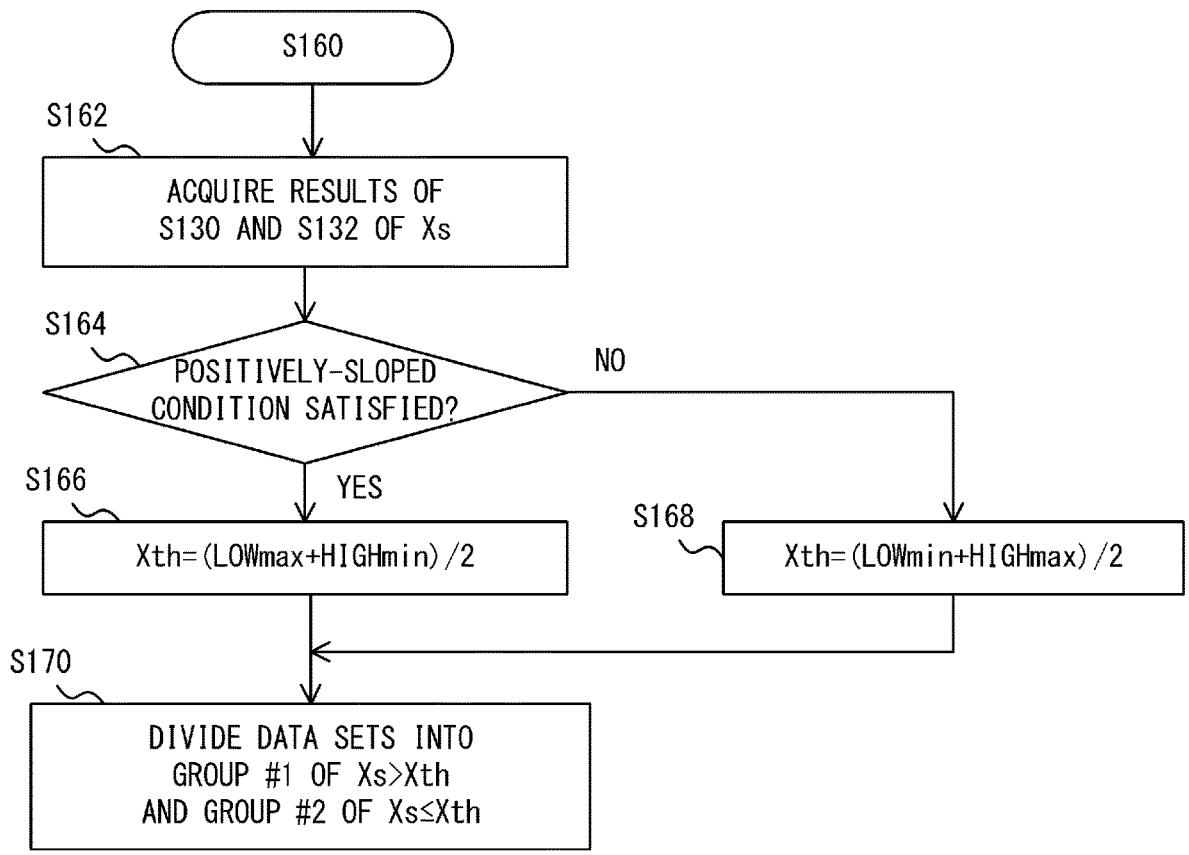
FIG. 13 is a diagram showing processing of dividing the data sets performed by a division unit according to the first embodiment.

FIG. 13 is a diagram showing processing of dividing the data sets performed by the division unit 120 according to the first embodiment. First, the division unit 120 acquires the results in S130 and S132 (FIG. 10) of the stratification explanatory variable Xs determined in the process of S120 (Step S162). In the example shown in FIG. 12, LOWmax, LOWmin, HIGHmax, and HIGHmin of the stratification explanatory variable X133 when the division number n=16 are acquired. Next, the division unit 120 determines whether the stratification explanatory variable Xs has satisfied the positively-sloped stratification condition in the process of S134 (Step S164). When the stratification explanatory variable Xs has satisfied the positively-sloped stratification condition (YES in S164), the division unit 120 sets the threshold Xth to be the average of LOWmax and HIGHmin, that is, Xth=(LOWmax+HIGHmin)/2 (Step S166).

On the other hand, when the stratification explanatory variable Xs has satisfied the negatively-sloped stratification condition (NO in S164), the division unit 120 sets the threshold Xth to be the average of LOWmin and HIGHmax, that is, Xth=(LOWmin+HIGHmax)/2 (Step S168). The threshold Xth may not be the exact average value of LOWmax and HIGHmin or the average value of LOWmin and HIGHmax, and may be an approximate value of these average values. That is, Xth may be a value between LOWmax and HIGHmin (S166) or a value between LOWmin and HIGHmax (S168). That is, it is sufficient that Xth fall within LOWmax<Xth<HIGHmin (S166) or HIGHmax<Xth<LOWmin (S168).

Next, the division unit 120 divides the data sets using the stratification explanatory variable Xs and the threshold Xth (Step S170). Specifically, the division unit 120 divides (classifies) the data sets into a group #1 of Xs>Xth and a group #2 of Xs≤Xth. Accordingly, the plurality of data sets are divided for each layer. In the example shown in FIG. 12, regarding the stratification explanatory variable X133, the threshold Xth is determined to be 12.1. Then the data sets in which the value of X133 is larger than 12.1 are allocated to (classified into) the group #1, and the data sets in which the value of X133 is equal to or smaller than 12.1 are allocated to (classified into) the group #2. In this case, since the negatively-sloped stratification condition is satisfied in the example shown in FIG. 12, all the n data sets in which the objective variables y are small are classified into the group #1 and all the (N−n) data sets in which the objective variables y are large are classified into the group #2.

Next, the analysis unit 122 performs the multiple regression analysis on each of the groups of the plurality of data sets divided for each layer (Step S180 in FIG. 5). Specifically, the analysis unit 122 performs the multiple regression analysis using the data set of the group #1. In a similar way, the analysis unit 122 performs the multiple regression analysis using the data set of the group #2. In this case, the analysis unit 122 performs the multiple regression analysis for the group #1 and the multiple regression analysis for the group #2 independently from each other.

More specifically, the analysis unit 122 calculates the multiple regression equation $f_1 = x_{11}a_{11} + x_{12}a_{12} + \ldots + x_{1p}a_{1p} + b_1$ for the group #1. Further, the analysis unit 122 calculates the multiple regression equation $f_2 = x_{21}a_{21} + x_{22}a_{22} + \ldots + x_2q_{2q} + b_2$ for the group #2. Here, $x_{ij}$ is one of the explanatory variables, $a_{ij}$ is a coefficient of $x_{ij}$, and $b_i$ is an intercept. Further, p is the number of explanatory variables to be used in the multiple regression analysis for the group #1. Further, q is the number of explanatory variables to be used in the multiple regression analysis for the group #2.

By solving the simultaneous equation of the coefficient $a_{ij}$ and the intercept $b_i$ obtained by applying the objective variable y and the explanatory variable Xk of each of the data sets of each group to the multiple regression equation, each of the coefficients and the intercept of the multiple regression equation may be calculated. In order to enable the coefficients and the intercept to be solved, the number of data sets (the number of simultaneous equations) needs to be equal to or larger than the total number of coefficients and intercepts. Accordingly, when the analysis unit 122 performs the multiple regression analysis for each group, the number of explanatory variables Xk is narrowed down to (the number of data sets forming each group)−1. In the example shown in FIG. 12, the number of data sets of the group #1 is 16. Therefore, when the analysis unit 122 performs the multiple regression analysis regarding the group #1, the number of explanatory variables Xk is narrowed down to 15. In a similar way, the number of data sets of the group #2 is 10. Therefore, when the analysis unit 122 performs the multiple regression analysis regarding the group #2, the number of explanatory variables Xk is narrowed down to nine. When the number of explanatory variables Xk is narrowed down, the explanatory variables Xk to be used for the multiple regression analysis may be selected in order from the one whose contribution rate calculated by the process of S104 is the highest. Alternatively, the explanatory variables Xk to be used for the multiple regression analysis may be selected from the explanatory variables Xk extracted in the process of S110. In this case, the explanatory variables Xk whose coefficients of determination $R^2$ of the single regression analysis are high may be selected from among the explanatory variables Xk extracted in the process of S110 as explanatory variables Xk to be used for the multiple regression analysis.

Next, the regression equation acquisition unit 124 acquires the integrated multiple regression equation using the results of S180 (Step S182). Specifically, the regression equation acquisition unit 124 integrates two multiple regression equations $f_1$ and $f_2$ by the following Expression (1) to acquire the integrated multiple regression equation. The symbol Y indicates the predicted value of the objective variable.

$$Y = \begin{cases} f_1, & Xs > Xth \\ f_2, & Xs \leq Xth \end{cases} \quad (1)$$

FIG. 14 is a diagram for explaining a specific example of the processes of S160-S182 shown in FIG. 5. FIG. 14 shows a specific example of processing in the example shown in FIG. 12. First, in the process of S160, N=26 data sets are divided into a group #1 (indicated by white circles) and a group #2 (indicated by black circles). In this case, as described above, N=26 data sets are divided into the group #1 (16 data sets) and the group #2 (10 data sets) for each layer at the threshold Xth (=12.1) of the stratification explanatory variable Xs (X133). In the process of S180, a multiple regression analysis #1 and a multiple regression analysis #2 are respectively performed for the group #1 and the group #2.

As a result of the multiple regression analysis #1, the multiple regression equation $f_1$=X056*2.405+X079*(−0.77)+X150*20.454+X305*(−0.042)+X306*0.026+6.203 can be obtained. Further, as a result of the multiple regression analysis #2, the multiple regression equation $f_2$=X051*(−0.511)+X056*21.903+X090*192.249+X147*(−53.719)+X195*186.77−106.245 can be obtained. Then the integrated multiple regression equation in which the multiple regression equation $f_1$ and the multiple regression equation $f_2$ are integrated as shown in Expression (1) is acquired by the process of S182. That is, the predicted value Y of the objective variable follows the multiple regression equation $f_1$ when X133>12.1 and follows the multiple regression equation $f_2$ when X133≤12.1.

Next, the result display unit 126 displays the results of the multiple regression analysis using the integrated multiple regression equation (Step S184). Specifically, as illustrated in FIG. 15, the result display unit 126 controls the interface unit 108 and displays the results of the multiple regression analysis in such a way that the user is able to visually recognize these results.

Figure 15:
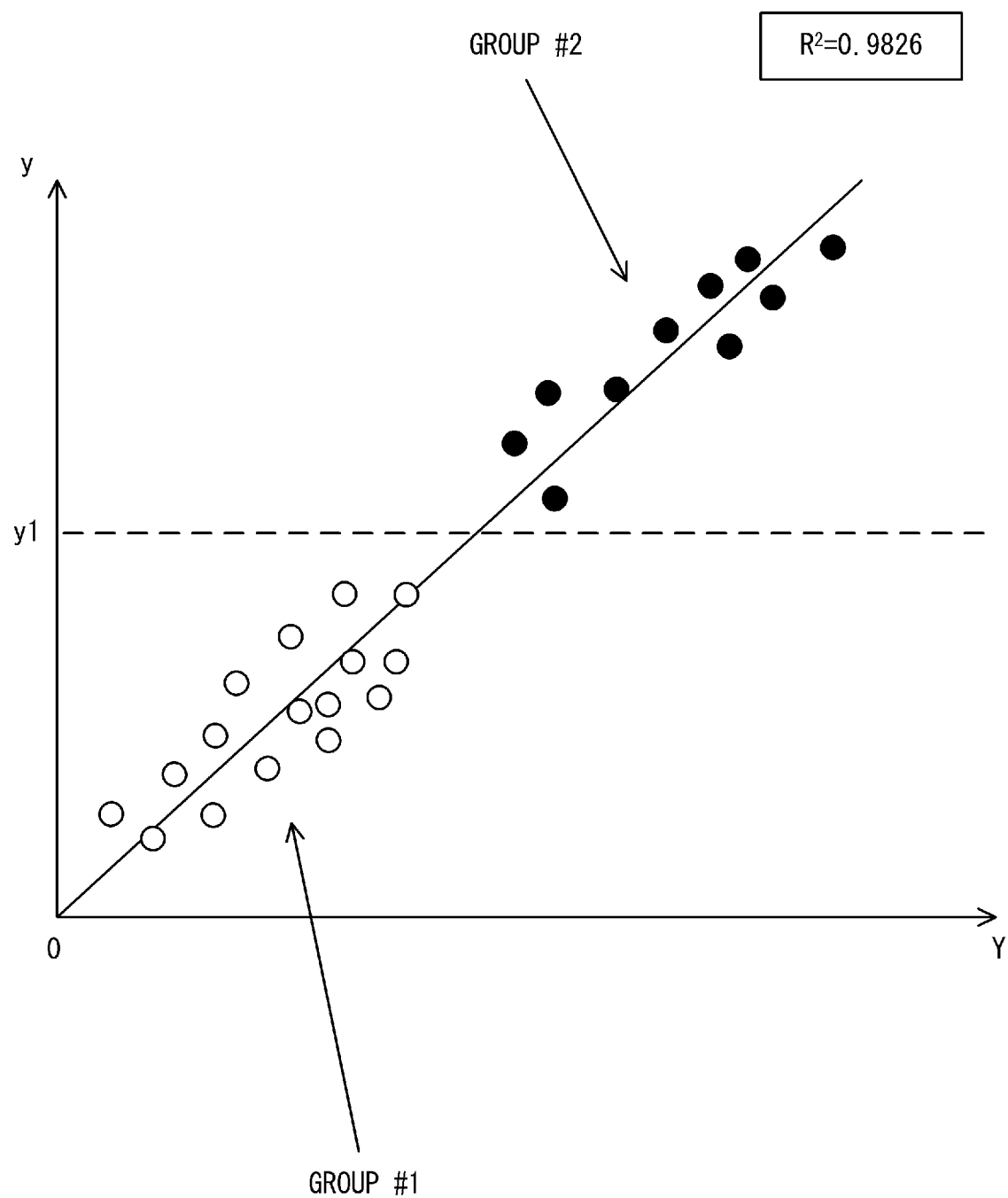
FIG. 15 is a diagram for illustrating results of the multiple regression analysis using an integrated multiple regression equation according to the first embodiment.

FIG. 15 is a diagram for illustrating results of the multiple regression analysis using the integrated multiple regression equation according to the first embodiment. In FIG. 15, the horizontal axis indicates the predicted value Y of the objective variable and the vertical axis indicates the actual value y of the objective variable. The straight line indicates Y=y. As shown in FIG. 15, the data sets in the group #1 (indicated by white circles) are distributed in the vicinity of Y=y in a region smaller than y=y1. Further, the data sets in the group #2 (indicated by black circles) are distributed in the vicinity of Y=y in a region larger than y=y1. Then the coefficient of determination $R^2$ is displayed as the accuracy of the multiple regression analysis that uses the integrated multiple regression equation. Since $R^2$=0.9826, it can be said that the accuracy of the multiple regression analysis that uses the integrated multiple regression equation is relatively high.

As described above, the multiple regression analysis apparatus 100 according to this embodiment automatically performs stratification for the plurality of data sets, performs a multiple regression analysis on each of the groups of the data sets that have been stratified, and acquires the integrated multiple regression equation in which these results are integrated. In this way, the multiple regression analysis is performed separately on each of the groups of the data sets that have been stratified, whereby it becomes possible to accurately perform the multiple regression analysis even when there are a number of explanatory variables. Accordingly, even when the number of explanatory variables is large, it is possible to prevent the generalization performance of an estimated formula from being reduced (the curse of dimensionality).

Further, as illustrated in the processes of S104-S110 (FIG. 5) according to the first embodiment, the stratification explanatory variable is determined after the number of explanatory variables is narrowed down to the explanatory variables whose respective contribution rates are high in advance, whereby the number of explanatory variables regarding which it is determined whether they may serve as a stratification explanatory variable can be reduced. Accordingly, it becomes possible to improve the speed of determining the stratification explanatory variable.

Further, as will be described later, by calculating the contribution rates using the non-linear regression method, it becomes possible to efficiently determine the effective stratification explanatory variable. The stratification means grouping, when the linearity of an objective variable y of a data set becomes different depending on whether an explanatory variable exceeds a certain value (threshold) of a certain explanatory variable, the data set depending on whether the explanatory variable exceeds the threshold of the explanatory variable. Accordingly, the explanatory variable (stratification explanatory variable) for grouping the data set for each layer has discontinuity, that is, non-linearity, with respect to the objective variable, as will be understood from Expression (1). Accordingly, the explanatory variables regarding which it is determined whether they may serve as a stratification explanatory variable may be the ones whose respective contribution rates calculated using the non-linear regression method are high, whereby it becomes possible to efficiently determine the effective stratification explanatory variable. In other words, by using the non-linear regression method, the contribution rates can be calculated in such a way that the contribution rates of the explanatory variables that are effective for the stratification become high. Further, as described above, when the random forest of the non-linear regression method is used, the speed of calculating the contribution rates becomes fast. Therefore, by calculating the contribution rates of the explanatory variables using the random forest, it becomes possible to further improve the speed of determining the stratification explanatory variable.

In the regression method that uses only a linear regression method such as Ridge, Lasso, or Elastic Net, it is possible that the importance of the explanatory variables that are effective for the stratification (division of regions) may not be grasped. On the other hand, the non-linear regression method enables to grasp the importance of the explanatory variables that are effective for the stratification (division of regions), whereas it is difficult to obtain a linear influence trend of each explanatory variable. Accordingly, in the non-linear regression method, it is difficult for human beings to intuitively grasp changes in the objective variable in accordance with the changes in the explanatory variables.

On the other hand, the multiple regression analysis apparatus 100 according to this embodiment determines the explanatory variables that are effective for the stratification using a non-linear regression method to perform stratification of the data sets, and performs linear regression (multiple regression analysis) for each of the groups of the data sets that have been stratified. Accordingly, by using the multiple regression analysis apparatus 100 according to this embodiment, it is possible to solve the problems of the linear regression method and the non-linear regression method described above.

Second Embodiment

Next, a second embodiment will be explained. The second embodiment is different from the first embodiment in that a plurality of stratification explanatory variables are determined in the second embodiment. Since the configuration of the multiple regression analysis apparatus 100 according to the second embodiment is substantially similar to that shown in FIG. 2, descriptions thereof will be omitted. Further, a multiple regression analysis method executed by the multiple regression analysis apparatus 100 is substantially similar to that shown in FIG. 5 except for a few points. In the following description, processing of the second embodiment that is different from the processing in the first embodiment (S120 and S160) will be explained. Note that, in the following description, an example in which two stratification explanatory variables are determined is illustrated.

Figure 16:
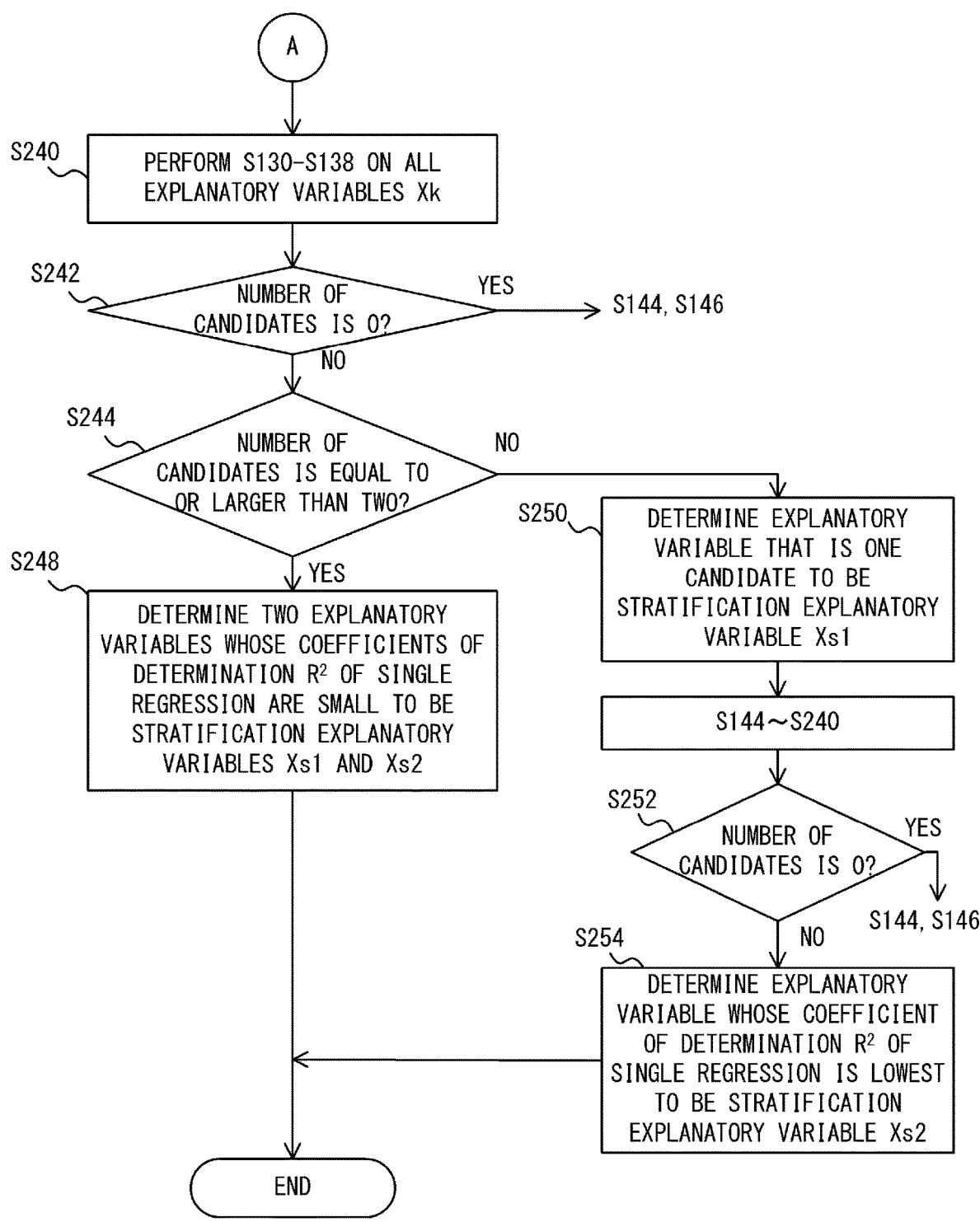
FIG. 16 is a flowchart indicating a method of determining a stratification explanatory variable performed by a determination unit according to a second embodiment.

FIG. 16 is a flowchart showing a method of determining the stratification explanatory variable performed by the determination unit 118 according to the second embodiment. FIG. 16 shows processing performed at the stage next to the processing shown in FIG. 10. That is, the determination unit 118 according to the second embodiment performs the processing shown in FIGS. 10 and 16.

The determination unit 118 performs processes of S130-S138 on all the explanatory variables Xk extracted by the process of S110 (Step S240). Next, the determination unit 118 determines whether the number of candidates for the stratification explanatory variables is 0 (Step S242). When the number of candidates for the stratification explanatory variables is 0 (YES in S242), the determination unit 118 performs processes of S144 and S146 (FIG. 11).

On the other hand, when the number of candidates for the stratification explanatory variables is not 0 (NO in S242), the determination unit 118 determines whether the number of candidates for the stratification explanatory variables is equal to or larger than two (Step S244). When the number of candidates for the stratification explanatory variables is equal to or larger than two (YES in S244), the determination unit 118 determines two explanatory variables whose coefficients of determination $R^2$ of the single regression analysis are small to be stratification explanatory variables Xs (Step S248). When the number of candidates for the stratification explanatory variables is two, the determination unit 118 determines the explanatory variables Xk that are two candidates to be the stratification explanatory variables Xs. Accordingly, two stratification explanatory variables Xs1 and Xs2 are determined.

On the other hand, when the number of candidates for the stratification explanatory variables is not equal to or larger than two, that is, when the number of candidates is one (NO in S244), the determination unit 118 determines the explanatory variable Xk that is one candidate to be the stratification explanatory variable Xs (Step S250). Then the determination unit 118 repeats processes of S144-S240 illustrated in FIGS. 11, 10, and 16. After that, the determination unit 118 determines whether the number of candidates for the stratification explanatory variables is 0 (Step S252). When the number of candidates is 0 (YES in S252), the determination unit 118 performs processes of S144 and S146 (FIG. 11). On the other hand, when the number of candidates is not 0 (NO in S252), the determination unit 118 determines the explanatory variable whose coefficient of determination $R^2$ of the single regression analysis is the lowest to be another stratification explanatory variable Xs (Step S254). Accordingly, two stratification explanatory variables Xs1 and Xs2, one of which is the one determined in the process of S250, are determined.

Figure 17:
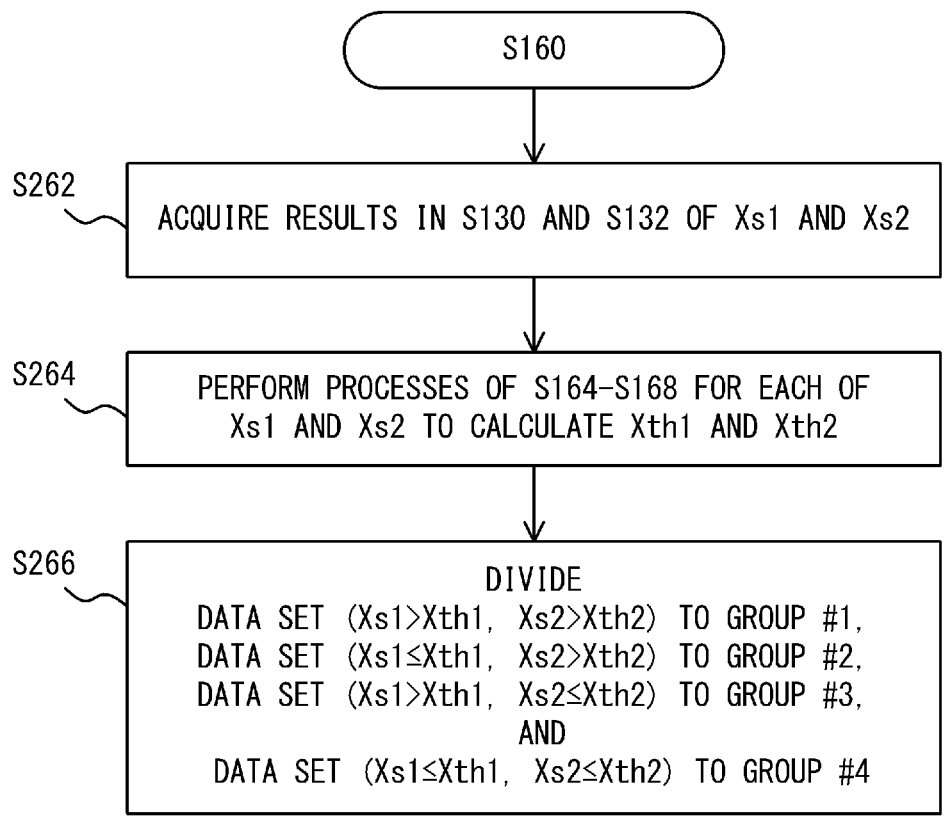
FIG. 17 is a diagram showing processing of dividing data sets performed by a division unit according to the second embodiment.

FIG. 17 is a diagram showing processing of dividing the data sets performed by the division unit 120 according to the second embodiment. The division unit 120 acquires the results in S130 and S132 of the stratification explanatory variables Xs1 and Xs2 determined in the process of S120 (Step S262). Next, the division unit 120 performs processes of S164-S168 shown in FIG. 13 for each of the stratification explanatory variables Xs1 and Xs2 to calculate the thresholds Xth1 and Xth2 (Step S264). The threshold Xth1 is a threshold in the stratification explanatory variable Xs1 and the threshold Xth2 is a threshold in the stratification explanatory variable Xs2.

Next, the division unit 120 divides the data sets using the threshold Xth1 of the stratification explanatory variable Xs1 and the threshold Xth2 of the stratification explanatory variable Xs2 (Step S266). Specifically, the division unit 120 allocates a data set of Xs1>Xth1 and Xs2>Xth2 to a group #1. Further, the division unit 120 allocates a data set of Xs1≤Xth1 and Xs2>Xth2 to a group #2. Further, the division unit 120 allocates a data set of Xs1>Xth1 and Xs2≤Xth2 to a group #3. Further, the division unit 120 allocates a data set of Xs1≤Xth1 and Xs2≤Xth2 to a group #4. In this way, the data sets are allocated to four ($=2^2$) groups.

Figure 18:
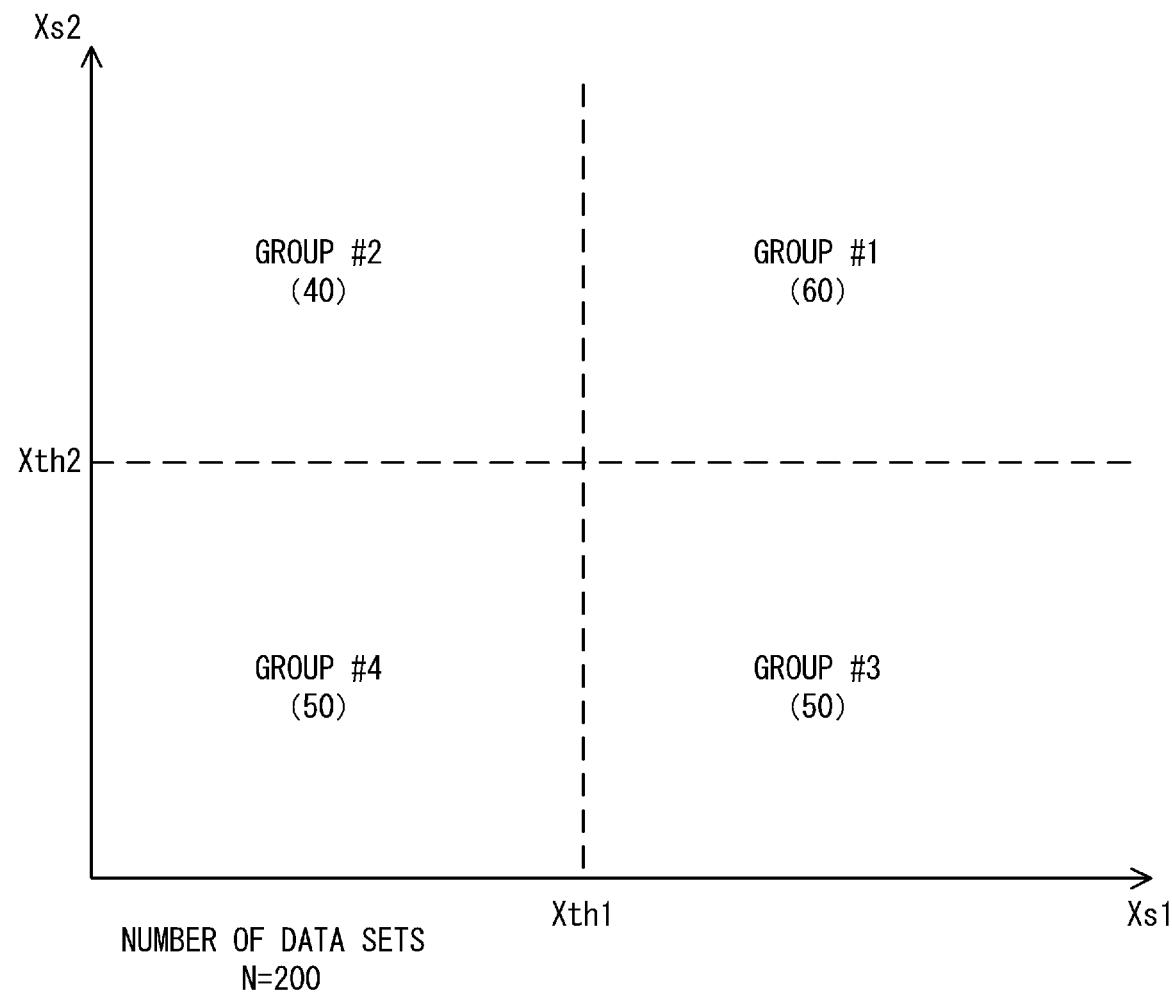
FIG. 18 is a diagram for illustrating the data sets divided for each layer by the division unit according to the second embodiment.

FIG. 18 is a diagram for illustrating data sets divided for each layer by the division unit 120 according to the second embodiment. It is assumed, in the example shown in FIG. 18, that the number of data sets is 200 (N=200). Sixty data sets are allocated to the group #1. Forty data sets are allocated to the group #2. Fifty data sets are allocated to the group #3. Fifty data sets are allocated to group #4. In this way, when the number of data sets is relatively large, even when there are a plurality of stratification explanatory variables, the number of data sets divided for each layer may be sufficient to perform the multiple regression analysis.

Then the analysis unit 122 performs the multiple regression analysis for each of the groups #1-#4 to obtain four multiple regression equations (S180 in FIG. 5). The regression equation acquisition unit 124 integrates four multiple regression equations by a method similar to that in Expression (1), thereby acquiring the integrated multiple regression equation (S182 in FIG. 5). Then the result display unit 126 displays the results of the multiple regression analysis using the integrated multiple regression equation (S184 in FIG. 5).

While the case in which two stratification explanatory variables are used has been described in the above second embodiment, similar processing is performed also in a case in which three stratification explanatory variables are determined. When three stratification explanatory variables are used, the process of S244 is replaced by a determination regarding whether the number of candidates for the stratification explanatory variables is three or larger and the process of S248 is replaced by a process of determining three explanatory variables whose coefficients of determination $R^2$ of the single regression analysis are low to be the stratification explanatory variables Xs in FIG. 16. Further, when the number of candidates for the stratification explanatory variables is not equal to or larger than 3, the determination unit 118 determines one or two explanatory variables to be the stratification explanatory variable Xs (this process corresponds to the process of S250), and determines the remaining stratification explanatory variables by a process similar to that shown in FIG. 16. Then the division unit 120 performs a process similar to that shown in FIG. 17, and divides the data sets into eight ($=2^3$) groups. Then the analysis unit 122 performs the multiple regression analysis on each of the eight groups, thereby obtaining eight multiple regression equations (S180 in FIG. 5). The regression equation acquisition unit 124 integrates the eight multiple regression equations by a method similar to that in Expression (1), thereby acquiring the integrated multiple regression equation (S182 in FIG. 5). Then the result display unit 126 displays the results of the multiple regression analysis using the integrated multiple regression equation (S184 in FIG. 5).

As described in the second embodiment, the number of stratification explanatory variables is not limited to one and may be plural. By using a plurality of stratification explanatory variables, the data sets may be divided for each layer more finely, whereby it may be possible to perform a multiple regression analysis more accurately than that in the first embodiment. When the number of data sets is small, it is possible that the number of data sets of each group divided for each layer may be smaller than the number of data sets that is necessary to perform the multiple regression analysis. Accordingly, setting a plurality of stratification explanatory variables, that is, dividing the data sets into four or eight layers, may be effective when the number of data sets is relatively large.

Modified Examples

The present disclosure is not limited to the aforementioned embodiments and may be omitted as appropriate without departing from the spirit of the present disclosure. For example, in the aforementioned flowcharts, the order of the plurality of processes may be changed as appropriate. Further, in the aforementioned flowcharts, one of the plurality of processes may be omitted.

For example, the processes of S104-S110 shown in FIG. 5 may be omitted. That is, there is no need to determine stratification explanatory variables after the explanatory variables to be processed are narrowed down in advance to the ones whose respective contribution rates are high, as in the processes of S104-S110. In this case, "all the explanatory variables Xk" in S140 (FIG. 11) may be all the explanatory variables that compose a data set (in the example shown in FIG. 6, 318 explanatory variables), not the explanatory variables extracted by the process of S110 (in the example shown in FIG. 9, 25 explanatory variables). As described above, by performing the processes of S104-S110 in the first embodiment, it becomes possible to improve the speed of determining the stratification explanatory variable.

Further, while the contribution rates are calculated using the non-linear regression method in the process of S104 in the aforementioned embodiments, the present disclosure is not limited to this configuration. That is, the non-linear regression method may not be used when the contribution rates of the explanatory variables are calculated. However, as described above, by calculating the contribution rates using the non-linear regression method, it becomes possible to efficiently determine the effective stratification explanatory variable.

Further, while one integrated multiple regression equation is acquired in the process of S182 in the aforementioned embodiments, the present disclosure is not limited to this configuration. The plurality of integrated multiple regression equations may be acquired, and one of the multiple regression equations whose coefficient of determination is the highest may be selected as the one to be used for the actual regression analysis. Specifically, as shown in FIG. 16, the plurality of stratification explanatory variables are determined, and the plurality of data sets are divided into two or four groups for each layer using the respective stratification explanatory variables. When, for example, two stratification explanatory variables Xs1 and Xs2 are used, three sets of groups (two group obtained by using the stratification explanatory variable Xs1, two groups obtained by using the stratification explanatory variable Xs2, and four groups obtained by using the stratification explanatory variables Xs1 and Xs2) are generated. In this way, a plurality of integrated multiple regression equations that correspond to the respective sets are acquired. Accordingly, it becomes possible to select an integrated multiple regression equation whose accuracy of the regression analysis is higher as an integrated multiple regression equation to be used for an actual analysis.

Further, in the above examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A multiple regression analysis apparatus for analyzing a state of a vehicle battery in bench testing, the apparatus configured to perform a multiple regression analysis on a plurality of vehicle state data sets from the vehicle, wherein each of the plurality of vehicle data sets is composed of a plurality of explanatory variables and an objective variable, the objective variable is one of a plurality of states in the vehicle which are detected by a sensor, and the plurality of explanatory variables are other states of the plurality of states in the vehicle which are detected by the sensor, the apparatus comprising:

hardware, including at least one memory storing computer executable program instructions and at least one processor configured to execute the computer executable program instructions;
a vehicle and a vehicle battery subject to bench testing;
a calculation unit, implemented by the hardware, programmed to execute program instructions stored in the at least one memory to calculate a contribution rate that is degree of importance of each of the plurality of explanatory variables to the objective variable, the calculation unit performing the regression analysis of the objective variable on the plurality of vehicle state data sets using a random forest that uses each explanatory variable for condition branch for each of a plurality of decision trees, counting a number of explanatory variables employed for the first branch of the decision tree generated at the time of the regression analysis, and calculating the contribution rate of each of the explanatory variables based on a ratio of the number of times each of the explanatory variables is employed for the first branch to a number of a plurality of decision trees used in the random forest;
an extraction unit, implemented by the hardware, programmed to execute program instructions stored in the at least one memory to extract the explanatory variables, the number of which satisfies a predetermined condition and the calculated contribution rates of which are high, from among the plurality of explanatory variables,
a determination unit, implemented by the hardware, programmed to execute program instructions stored in the at least one memory to determine one of the plurality of explanatory variables that is effective as a parameter when stratification of the plurality of vehicle state data sets is performed to be a stratification explanatory variable from the extracted explanatory variables, the determination unit further programmed to execute program instructions stored in the at least one memory to divide the plurality of vehicle state data sets into a section whose objective variables are small and a section whose objective variables are large, and determine the explanatory variable that satisfies a first condition or a second condition as stratification explanatory variable, the first condition being a condition where the explanatory variable is equal to or smaller than a first threshold for all of vehicle state data sets in the section whose objective variables are small and the explanatory variable is larger than the first threshold for all of vehicle state data sets in the section whose objective variables are large, and the second condition being a condition where the explanatory variable is larger than a second threshold for all of vehicle state data sets in the section whose objective variables are small and the explanatory variable is equal to or smaller than the second threshold for all of vehicle state data sets in the section whose objective variables are large;
a division unit, implemented by the hardware, programmed to execute program instructions stored in the at least one memory to divide the plurality of vehicle state data sets for each layer using the stratification explanatory variable;
an analysis unit, implemented by the hardware, programmed to execute program instructions stored in the at least one memory to perform a multiple regression analysis on each of groups of the plurality of vehicle state data sets that have been divided;
an acquisition unit, implemented by the hardware, programmed to execute program instructions stored in the at least one memory to acquire an integrated multiple regression equation in which results of the multiple regression analysis are integrated; and a display unit that displays the acquired multiple regression equation in which results of the multiple regression analysis are integrated;

wherein the objective variable is a battery output of the vehicle battery, and the plurality of explanatory variables are a current, a current change amount, a continuous charge or discharge amount within a past fixed period of time, a temperature of the vehicle battery, and a charge amount of the vehicle battery.

2. The multiple regression analysis apparatus according to claim 1, wherein the determination unit determines, when there are a plurality of candidates for the stratification explanatory variable, the candidate whose coefficient of determination $R^2$ obtaining by performing a single regression analysis for explanatory variable of each of the candidates is the lowest to be the stratification explanatory variable.

3. A multiple regression analysis method for bench testing a battery of a vehicle comprising the steps of:

performing a multiple regression analysis on a plurality of vehicle state data sets, each of which is composed of a plurality of explanatory variables and an objective variable, wherein the objective variable is one of a plurality of states in the vehicle which are detected by a sensor, and the plurality of explanatory variables are other states of the plurality of states in the vehicle which are detected by the sensor, the method further comprising the steps of:

executing program instructions stored in a memory to calculate a contribution rate that is degree of importance of each of the plurality of explanatory variables to the objective variable, the calculation unit performing the regression analysis of the objective variable on the plurality of vehicle state data sets using a random forest that uses each explanatory variable for condition branch for each of a plurality of decision trees, counting a number of explanatory variables employed for the first branch of the decision tree generated at the time of the regression analysis, and calculating the contribution rate of each of the explanatory variables based on a ratio of the number of times each of the explanatory variables is employed for the first branch to a number of a plurality of decision trees used in the random forest;

executing program instructions stored in the memory to extract the explanatory variables, the number of which satisfies a predetermined condition and the calculated contribution rates of which are high, from among the plurality of explanatory variables, executing program instructions stored in the memory to determine one of the plurality of explanatory variables that is effective as a parameter when stratification of the plurality of vehicle state data sets is performed to be a stratification explanatory variable from the extracted explanatory variables, dividing the plurality of vehicle state data sets into a section whose objective variables are small and a section whose objective variables are large, and determining the explanatory variable that satisfies a first condition or a second condition as stratification explanatory variable, the first condition being a condition where the explanatory variable is equal to or smaller than a first threshold for all of vehicle state data sets in the section whose objective variables are small and the explanatory variable is larger than the first threshold for all of vehicle state data sets in the section whose objective variables are large, and the second condition being a condition where the explanatory variable is larger than a second threshold for all of vehicle state data sets in the section whose objective variables are small and the explanatory variable is equal to or smaller than the second threshold for all of vehicle state data sets in the section whose objective variables are large;

dividing the plurality of vehicle state data sets for each layer using the stratification explanatory variable;

performing a multiple regression analysis on each of groups of the plurality of vehicle state data sets that have been divided;

acquiring an integrated multiple regression equation in which results of the multiple regression analysis are integrated; and displaying the acquired integrated multiple regression equation in which results of the multiple regression analysis are integrated on a display device;

wherein the objective variable is a battery output of the vehicle battery, and the plurality of explanatory variables are a current, a current change amount, a continuous charge or discharge amount within a past fixed period of time, a temperature of the vehicle battery, and a charge amount of the vehicle battery.

* * * * *